(12) United States Patent
Gibson et al.

(10) Patent No.: US 11,395,935 B2
(45) Date of Patent: Jul. 26, 2022

(54) ADJUSTABLE RESISTANCE AND BRAKING SYSTEM FOR EXERCISE EQUIPMENT

(71) Applicant: Mad Dogg Athletics, Inc., Venice, CA (US)

(72) Inventors: Ronald S. Gibson, Venice, CA (US); John C. Cook, Venice, CA (US); John R. Baudhuin, Venice, CA (US)

(*) Notice: Subject to any disclaimer, the term of this patent is extended or adjusted under 35 U.S.C. 154(b) by 113 days.

(21) Appl. No.: 16/553,058

(22) Filed: Aug. 27, 2019

(65) Prior Publication Data

US 2020/0147435 A1    May 14, 2020

Related U.S. Application Data

(63) Continuation of application No. 15/421,260, filed on Jan. 31, 2017, now Pat. No. 10,391,348.

(60) Provisional application No. 62/289,814, filed on Feb. 1, 2016.

(51) Int. Cl.
| | | |
|---|---|---|
| *A63B 21/00* | (2006.01) | |
| *A63B 21/005* | (2006.01) | |
| *A63B 71/00* | (2006.01) | |
| *A63B 21/22* | (2006.01) | |
| *A63B 22/06* | (2006.01) | |
| *F16D 49/00* | (2006.01) | |
| *F16D 63/00* | (2006.01) | |
| *A63B 21/015* | (2006.01) | |

(52) U.S. Cl.
CPC ...... *A63B 21/00072* (2013.01); *A63B 21/005* (2013.01); *A63B 21/0051* (2013.01); *A63B 21/00069* (2013.01); *A63B 21/225* (2013.01); *A63B 22/0605* (2013.01); *A63B 71/0054* (2013.01); *F16D 49/00* (2013.01); *F16D 63/004* (2013.01); *A63B 21/015* (2013.01); *A63B 2022/0658* (2013.01); *A63B 2071/0081* (2013.01)

(58) Field of Classification Search
CPC ........ A63B 21/00069; A63B 21/00072; A63B 21/005; A63B 21/0051; A63B 21/0052; A63B 21/0056; A63B 21/015; A63B 21/225; A63B 22/0605; A63B 71/0054; A63B 2022/0658; A63B 2071/0081; F16D 49/00; F16D 63/004
See application file for complete search history.

(56) References Cited

U.S. PATENT DOCUMENTS

| | | | |
|---|---|---|---|
| 4,752,066 A | 6/1988 | Housayama | |
| 5,145,480 A * | 9/1992 | Wang | A63B 21/0051 482/5 |
| 5,586,624 A | 12/1996 | Ko et al. | |
| 5,656,001 A | 8/1997 | Baatz | |
| 5,685,806 A | 11/1997 | Yu | |
| 5,711,404 A | 1/1998 | Lee | |

(Continued)

FOREIGN PATENT DOCUMENTS

| | | |
|---|---|---|
| CN | 202 724 550 U | 2/2013 |
| WO | WO 2014/153158 | 9/2014 |
| WO | WO 2015/024150 | 2/2015 |

*Primary Examiner* — Joshua Lee
(74) *Attorney, Agent, or Firm* — WPAT Law, P.C.; Anthony King

(57) ABSTRACT

An adjustable resistance system for use with an indoor cycle comprising a magnetic resistance assembly, a friction brake assembly, and a resistance adjustment assembly.

8 Claims, 41 Drawing Sheets

(56) References Cited

U.S. PATENT DOCUMENTS

| | | |
|---|---|---|
| 5,848,953 A * | 12/1998 | Wei .................. A63B 21/0051 482/63 |
| 6,042,517 A | 3/2000 | Gunther et al. |
| 6,084,325 A | 7/2000 | Hsu |
| 6,095,953 A | 8/2000 | Lee et al. |
| 6,099,440 A | 8/2000 | Schurter et al. |
| 6,162,152 A | 12/2000 | Kuo |
| 6,244,990 B1 | 6/2001 | Cheng |
| 6,273,845 B1 | 8/2001 | Liou |
| 6,302,827 B1 | 10/2001 | Stevens |
| 6,485,397 B1 | 11/2002 | Manderbacka |
| 6,527,681 B2 | 3/2003 | Tacx |
| 6,569,063 B2 * | 5/2003 | Chen .................. A63B 21/0051 482/57 |
| 6,585,087 B2 | 7/2003 | Lin |
| 6,612,970 B2 | 9/2003 | Forcillo |
| 6,612,971 B1 | 9/2003 | Morris |
| 6,695,752 B2 | 2/2004 | Lee |
| 6,736,761 B2 | 5/2004 | Huang |
| 6,749,544 B1 | 6/2004 | Chen |
| 6,857,992 B1 | 2/2005 | Kolda et al. |
| 6,964,633 B2 | 11/2005 | Kolda et al. |
| 7,004,888 B1 | 2/2006 | Weng |
| 7,011,607 B2 | 3/2006 | Kolda et al. |
| 7,077,789 B1 | 7/2006 | Chen |
| 7,264,577 B2 | 9/2007 | Lin |
| 7,314,434 B2 | 1/2008 | Chen |
| 7,322,905 B2 | 1/2008 | Morris |
| 7,385,324 B2 | 6/2008 | Lin |
| 7,419,458 B2 | 9/2008 | Forcillo |
| 7,530,933 B2 | 5/2009 | Chen |
| 7,727,124 B1 | 6/2010 | Lassanske et al. |
| 7,785,236 B1 | 8/2010 | Lo |
| 7,901,334 B2 | 3/2011 | Chen et al. |
| 7,955,228 B2 | 6/2011 | Hamilton |
| 8,052,581 B1 | 11/2011 | Lohr et al. |
| 8,162,802 B2 | 4/2012 | Berg |
| 8,313,419 B2 | 11/2012 | Hamilton |
| 8,585,561 B2 | 11/2013 | Watt et al. |
| 8,808,150 B2 | 8/2014 | Choi |
| 8,876,668 B2 | 11/2014 | Hendrickson et al. |
| 9,044,635 B2 | 6/2015 | Lull |
| 9,050,494 B2 | 6/2015 | Bass et al. |
| 9,108,077 B2 | 8/2015 | Bass et al. |
| 9,707,430 B2 * | 7/2017 | Wu .................. A63B 21/00069 |
| 2001/0003110 A1 | 6/2001 | Lay |
| 2003/0022765 A1 | 1/2003 | Wu |
| 2003/0064863 A1 | 4/2003 | Chen |
| 2003/0109362 A1 | 6/2003 | Lee |
| 2003/0166436 A1 | 9/2003 | Gramaccioni |
| 2003/0166437 A1 | 9/2003 | Ho |
| 2005/0003934 A1 | 1/2005 | Wu |
| 2005/0020410 A1 | 1/2005 | Chang |
| 2006/0148622 A1 | 7/2006 | Chen |
| 2006/0160669 A1 | 7/2006 | Lizarralde |
| 2006/0189452 A1 | 8/2006 | Chou |
| 2007/0021278 A1 | 1/2007 | Pan et al. |
| 2007/0173381 A1 | 7/2007 | Chen |
| 2007/0203000 A1 | 8/2007 | Chiu |
| 2008/0261775 A1 | 10/2008 | Chang et al. |
| 2009/0239714 A1 | 9/2009 | Sellers |
| 2010/0069205 A1 | 3/2010 | Lee |
| 2010/0234185 A1 * | 9/2010 | Watt .................. A63B 21/0051 482/8 |
| 2013/0053223 A1 | 2/2013 | Shu-Chiung |
| 2014/0106936 A1 | 4/2014 | Puerschel |
| 2014/0171272 A1 | 6/2014 | Hawkins et al. |
| 2014/0203000 A1 | 9/2014 | Dalebout et al. |
| 2014/0287883 A1 | 9/2014 | Decca |
| 2015/0057130 A1 | 2/2015 | Lin et al. |
| 2015/0080189 A1 | 3/2015 | Villani |
| 2015/0080195 A1 | 3/2015 | Yeh |
| 2016/0263417 A1 * | 9/2016 | Golesh ............. A63B 21/00069 |
| 2016/0310785 A1 * | 10/2016 | Lo .................. A63B 21/005 |
| 2017/0036053 A1 * | 2/2017 | Smith ................ A63B 71/0054 |
| 2017/0106222 A1 * | 4/2017 | Mayer ................ A63B 22/0605 |

* cited by examiner

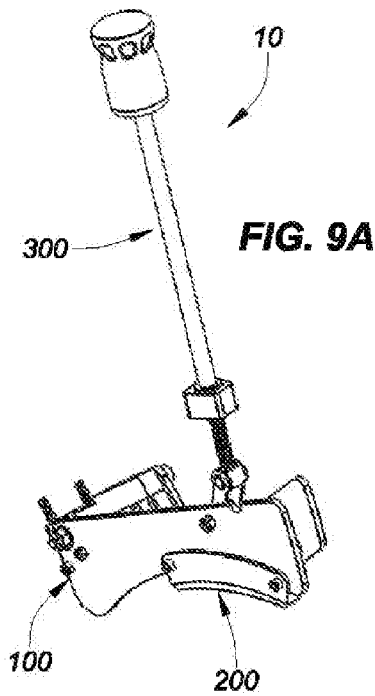
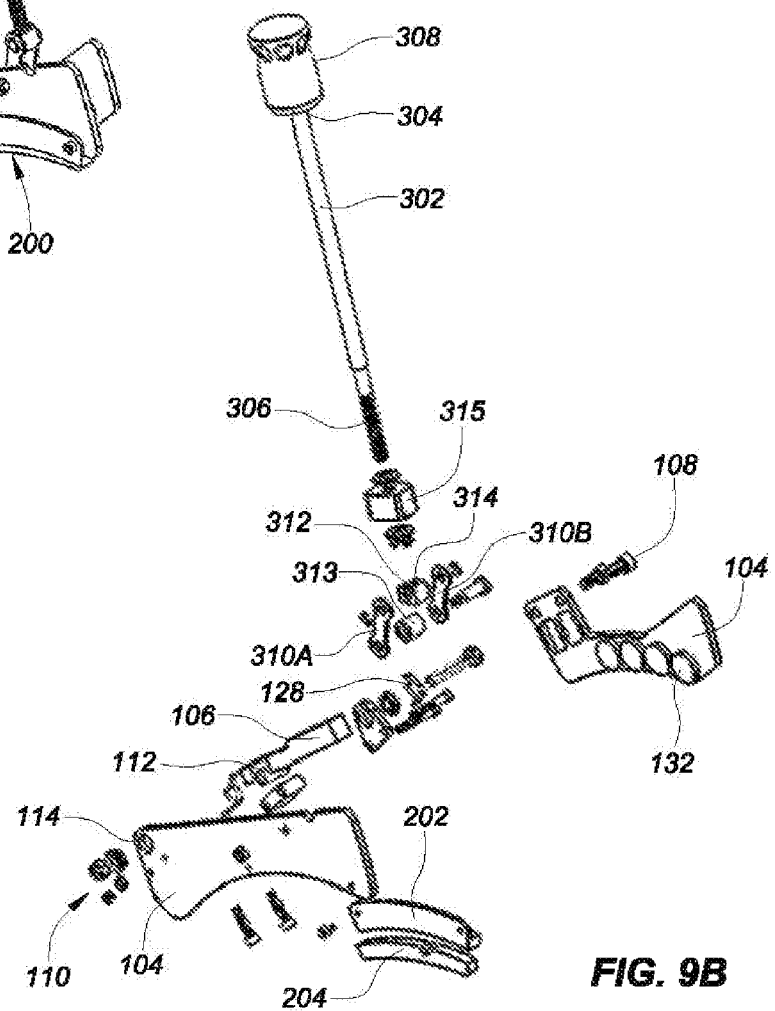

ADJUSTABLE RESISTANCE AND BRAKING SYSTEM FOR EXERCISE EQUIPMENT

CROSS REFERENCE TO RELATED APPLICATION

This application is a continuation of U.S. application Ser. No. 15/421,260, filed on Jan. 31, 2017, which claimed priority to U.S. Provisional Application No. 62/289,814, filed Feb. 1, 2016. The foregoing applications are incorporated herein by reference as if fully set forth herein.

FIELD OF THE INVENTION

The invention relates generally to exercise equipment and features thereof such as an adjustable resistance system and/or braking system and systems to measure the watts or level of energy exerted by the user, including a resistance system that uses magnets and a magnetic field to vary resistance and a brake that may physically engage a wheel or other component of the exercise equipment, and a system where flexing or movement of a component may allow the measurement of watts.

BACKGROUND OF THE INVENTION

Exercise equipment such as indoor cycles generally include a flywheel and a pedal assembly that are connected by a direct drive which is either a chain drive or belt drive. As the rider pedals, the chain drive or belt drive rotate the flywheel. The rotating flywheel maintains momentum as the user pedals to better simulate the feel of riding a regular road bicycle. Indoor cycles have frame geometries that allow the rider to assume different riding positions such as alternating sitting and standing positions. Through the direct drive, the momentum of the rotating flywheel also allows the rider to smoothly transition between sitting and standing positions which also helps simulate regular road bicycle riding conditions.

Variable resistance levels may be applied to the flywheel, which in turn make it more or less difficult for the rider to pedal thereby simulating different road riding conditions. This typically occurs with a knob that a rider may rotate one way to increase resistance and rotate the other way to decrease resistance. For example, less resistance may be applied to the flywheel when simulating riding on flat sections, while more resistance may be applied when simulating riding up hills and/or riding in a standing position. Variable resistance may also be applied along with different riding cadences to provide different aspects of the exercise, e.g., to provide a target heart rate.

Many indoor cycles use friction brakes to vary resistance on the flywheel. Friction brakes typically include a brake pad assembly that physically engages the flywheel. The rider may cause the brake pad to more or less forcefully engage the flywheel to increase or decrease resistance. This typically occurs by the rider rotating the above-mentioned resistance knob which serves to lower or raise a rod that in turn moves the brake pad towards or away from the flywheel thereby increasing or decreasing the resistance.

Engagement of the brake pad with the flywheel causes the pad to wear down over time, resulting in undesirable changes in the resistance characteristics of the cycle and necessitating repairs and/or replacement of the brake pad. While there have been magnetic resistance systems that have been introduced, these too have drawbacks in terms of cost, manufacturing complexity and other issues.

For example, the magnets in certain existing magnetic resistance systems are positioned on a movable arm located on either side of the flywheel such that when the arms are lowered towards the flywheel to impart more resistance, most or all of the magnets interact with the flywheel at the same time or almost the same time. This results in a significant increase in magnetic interaction with very little adjustment, e.g., very little rotation of the adjustment knob by the user, to effect the downward movement of the magnetic brake arms. As such, these systems do not provide much in the way of fine tuning the resistance, but instead provide significant increases in resistance very abruptly. This occurs because the maximum attractive force between magnets is always fixed, and the only variable is how much of the flywheel is covered by those magnets as the arms are moved.

Existing variable resistance systems may also include a brake or emergency brake that allows the rider to significantly slow or stop the flywheel from rotating. This typically occurs by the rider pushing down on the resistance knob, which in turn pushes down on the rod, which in turn pushes down the brake pad on the flywheel. However, because the emergency brake pad is typically the same brake pad that is used to apply variable resistance, the ability of the emergency brake to slow or stop the flywheel may be affected as the brake pad wears out.

Accordingly, there is a need in the art for an improved resistance system for an indoor cycle that will reduce the need for repairs and replacements and facilitate consistent resistance characteristics of the cycle over time, and increase safety.

Various exercise equipment also attempt to measure the user's energy exerted or watts. Oftentimes, this measurement is an approximation that may generally be inaccurate. Accordingly, there is a need for an improved system to measure watts.

SUMMARY OF THE INVENTION

The current invention addresses the foregoing and other drawbacks and issues associated with existing variable resistance and braking systems. In accordance with one aspect of the current invention, an adjustable resistance system for providing adjustable resistance to a rotating flywheel on a piece of exercise equipment is described. The system may be used with the flywheel of an indoor cycle or other rotating member on other types of exercise equipment. It may be used in traditional road bicycles.

In accordance with another aspect of the current invention, an adjustable resistance system is provided for an indoor cycle comprising a resistance assembly, a brake assembly, and resistance adjustment assembly. The adjustable resistance system preferably uses magnetic resistance and/or frictional resistance to selectively adjust the resistance applied to the rotation of a flywheel. In a preferred embodiment, magnetic resistance is used for the variable resistance aspect and a brake pad that may physically engage the flywheel may be used as a brake.

In accordance with another aspect of the current invention, an adjustable magnetic resistance system is provided for selectively adjusting the resistance applied to a rotating flywheel of an indoor cycle. The adjustable magnetic resistance system may include a fixed arm with at least one magnet, a pivotable arm with at least one magnet, and a pivot assembly disposed at or near the rear of the pivotable arm for allowing the pivotable arm to pivot between a first position and a second position to thereby adjust the resistance applied to the rotating flywheel.

In accordance with yet another aspect, an adjustable resistance system for an indoor cycle is provided which includes an magnetic resistance device comprising a fixed arm, a movable arm, and at least one magnet on each arm, a friction brake coupled to the movable arm, and an adjustment device configured to selectively operatively engage the magnetic resistance device and the friction brake.

In another aspect of the invention, the magnetic resistance system preferably allows fine tuning of the desired resistance, i.e., it allows discrete incremental increases and decreases in how much resistance is experienced by the user. The fixed arm/movable arm design of the current invention preferably allows the magnets to approach each other in a "scissoring" manner, so that the attractive force between magnets is a variable, keyed to the position of the movable magnet arm relative to the fixed magnet arm. Because the disc/braking portion of the flywheel is non-ferrous, the magnets of the fixed arm have negligible if any braking effect on the flywheel when the adjustable arm is raised and the magnets are not aligned. Accordingly, the resistance system of the current invention preferably allows a much more progressive increase of braking resistance as the adjustment knob is rotated to lower the adjustable arm, thus allowing much smaller incremental increases of resistance.

In another aspect of the current invention, a system to measure the user's level of energy expended when using the exercise equipment, or watts, is described. The system may be used with the magnetic resistance system described above. In one embodiment, one or both of the magnet-bearing arms may include a strain gauge that may measure the amount that the arm flexes due to the magnetic forces that arise as the flywheel rotates in proximity to the magnets. This measurement may then be processed by software to provide a measurement of watts.

As an alternative, a load cell or other similar device may be mounted between the frame or other stationary component of the exercise equipment and one or both of the magnet-bearing arms. As the magnetic forces arise as the flywheel rotates in proximity to the magnets, the magnet-bearing arm may generally flex and thereby press against the load cell. The amount of pressure may be measured and then processed by software to provide a measurement of watts.

In another aspect of the invention, a magnetic resistance system utilizing a single moveable arm with magnets positioned on each lateral surface is depicted. A flywheel with upward extending conductive disks allows for the single moveable arm to adjustably pivot into the area between the upward disks to establish a magnetic field that opposes the forward rotation of the flywheel. The single moveable arm may comprise several plates, e.g., a steel plate in the middle with an aluminum plate to hold magnets on either side. The single moveable arm may also comprise a single contiguous plate, e.g., an aluminum plate to hold magnets on it sides, with a slot in its middle which may receive a steel plate. The single moveable arm may be raised and lowered depending on the amount of resistance desired. In one embodiment, at least some of the magnets overlap the flywheel in both the raised and lowered positions.

BRIEF DESCRIPTION OF THE DRAWINGS

Embodiments of the present invention will now be described, by way of example only, with reference to the following drawings.

FIG. 9A shows a perspective view of an alternate embodiment of the resistance system, where the magnetic brake arms are longer as explained below.

FIG. 9B shows an exploded view of the alternate embodiment of the resistance system of FIG. 9A.

DESCRIPTION OF THE PREFERRED EMBODIMENTS

Figure 1:
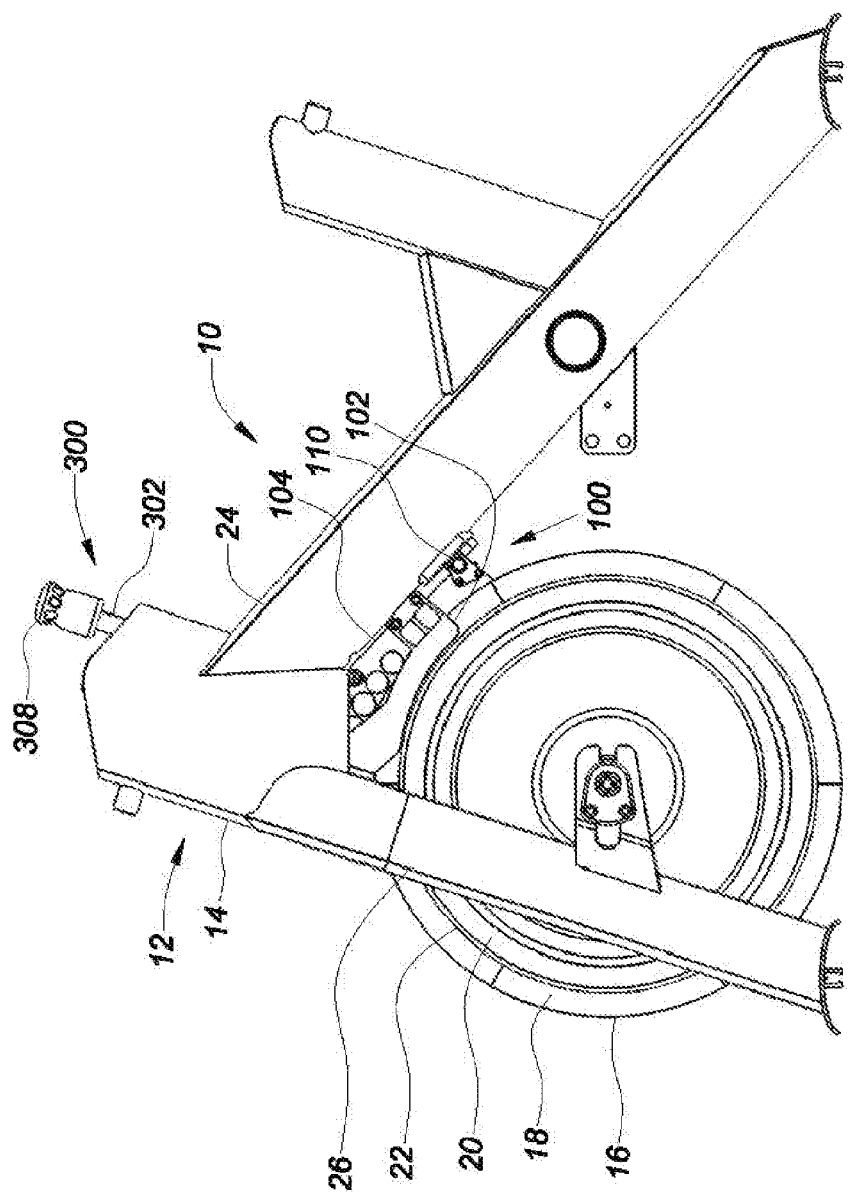
FIG. 1 shows a left side view of a resistance system in accordance with one aspect of the invention, with the resistance system shown in a first position relative to an indoor cycle, showing a fixed arm in the foreground and a movable arm positioned away from the flywheel.

With reference to the figures, a resistance system 10 is described herein for adjusting the resistance applied to a flywheel rotated by a drive train system. As illustrated in FIGS. 1-4 and 10A-C, the resistance system 10 is described herein with specific reference to an indoor cycle 12 having a frame 14, flywheel 16, and drive train system between flywheel 16 and a pedal assembly (not shown) for rotating the flywheel 16 as the rider pedals. However, as will be readily understood by those of skill in the art, the resistance system of the present invention may also be used with other exercise equipment which include a rotating member.

The described resistance system preferably utilizes a magnetic or eddy current brake to provide resistance to rotation of the flywheel 16. An eddy current brake, like a conventional friction brake, is a device that may be used to slow or stop a moving object by dissipating its kinetic energy as heat. However, unlike conventional friction brakes, in which the drag force used to stop the moving object is provided by friction between two surfaces pressed together, the drag force in an eddy current brake is a magnetic force between a magnet and a nearby conductive object in relative motion, arising from eddy currents induced in the conductor through magnetic induction.

A conductive surface moving past a stationary magnet having a magnetic field will have circular electric currents called eddy currents induced in it by the magnetic field. The circulating currents will create their own magnetic field which opposes the field of the magnet. Thus the moving conductor will experience a drag force from the magnet that opposes its motion, proportional to its velocity, and proportional to how close the magnet(s) are to the conductive surface.

One distinct advantage of a magnetic resistance system is that since it does not provide resistance by physical engagement or friction, there are no brake pad surfaces to wear out, so that brake pad replacement may be avoided contrary to friction-based resistance systems. Another advantage of using a magnetic resistance system regards an associated brake system. That is, even if a friction-type brake pad is used as a brake or emergency brake, it will not have been worn down from continuous use as a variable resistance system to potentially affect the system's performance as a brake or emergency brake.

As shown in FIGS. 1-4 and 10A-C, the resistance system 10 of the present invention may be operatively associated with and/or positioned relative to the flywheel 16 of an indoor cycle 12 and used to vary the resistance applied to the flywheel 16 to simulate different riding conditions and/or to provide different aspects of an exercise program. In accordance with one aspect of the invention, the resistance system 10 may include a resistance assembly 100, a brake assembly 200, and a resistance adjustment assembly 300. The resistance adjustment assembly 300 may operatively engage or be coupled to the resistance assembly 100 to vary the resistance on the flywheel 16 and/or to operatively engage or be coupled to the brake assembly 200 to slow or stop the flywheel 16 from rotating when acting as a brake or emergency brake.

The resistance system 10 of the present invention may be used with any suitable flywheel 16 when used with an indoor cycle, but may also be used with other types of rotating members in other types of exercise equipment. For example, the speed at which a rotating member rotates may be regulated by the resistance system 10 to regulate the speed at which the running surface of the treadmill travels.

Figure 3:
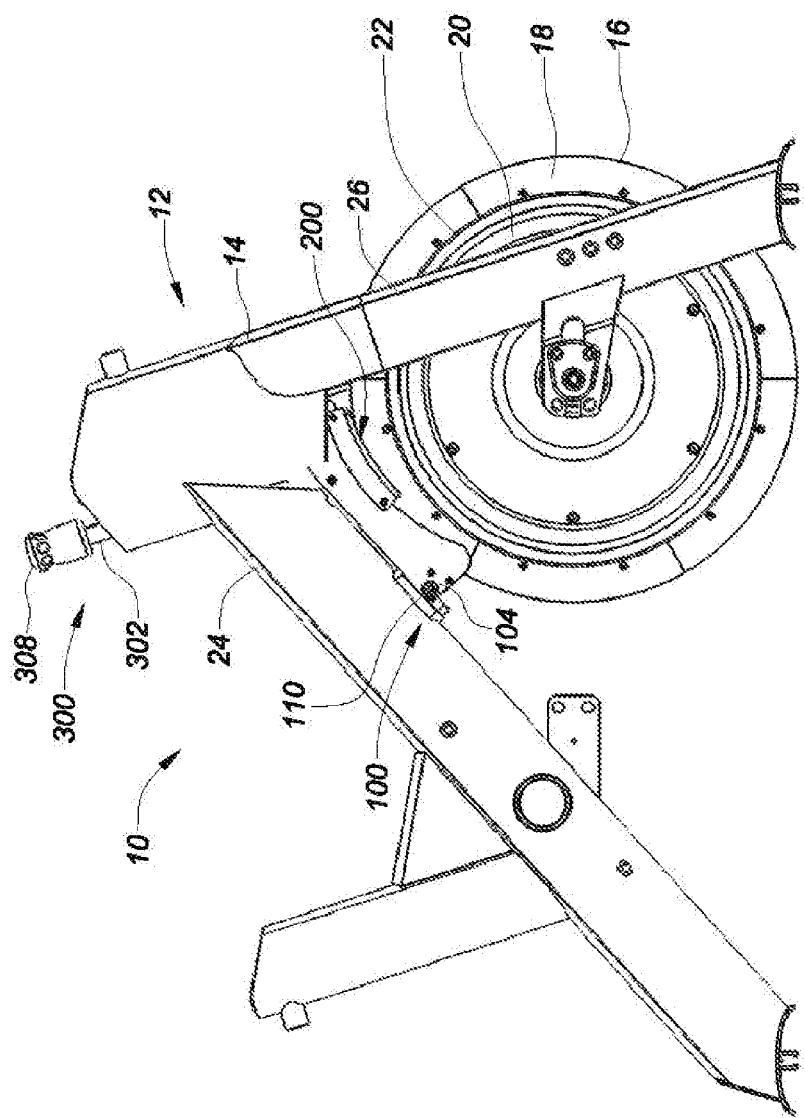
FIG. 3 shows a right side view of the resistance system of FIG. 1, with the resistance system shown in the first position relative to the indoor cycle, such that the movable arm is positioned away from the flywheel.
Figure 4:
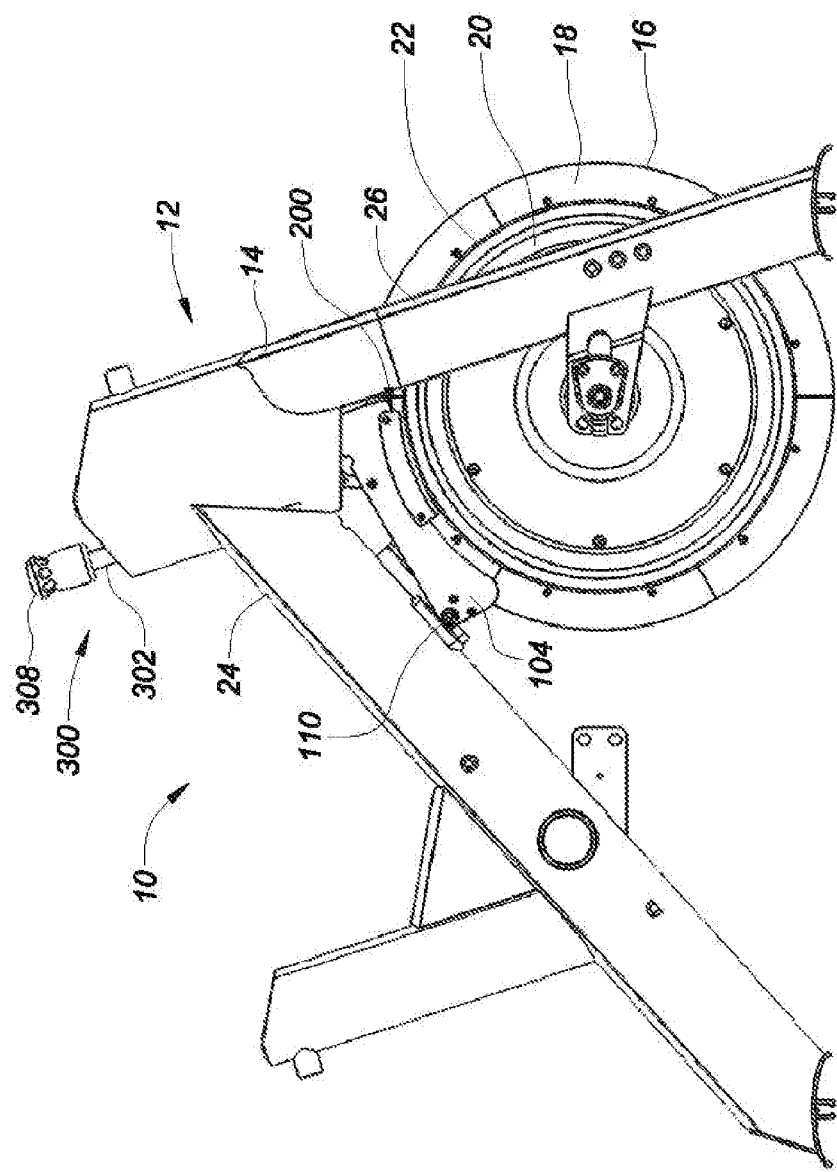
FIG. 4 shows another right side view of the resistance system of FIG. 1, with the resistance system shown in a second position relative to the indoor cycle, such that the movable arm is positioned closer to the flywheel.
Figure 10C:
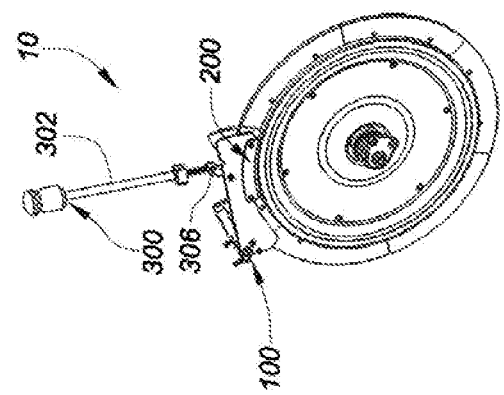
FIG. 10C shows an upper right perspective view of the resistance system of FIG. 9A in a second (lowered) position with respect to a flywheel.
Figure 10B:
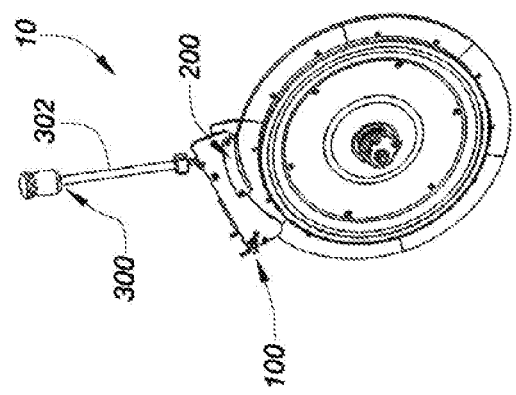
FIG. 10B shows an upper right perspective view of the resistance system of FIG. 9A in a first (raised) position with respect to a flywheel.
Figure 10A:
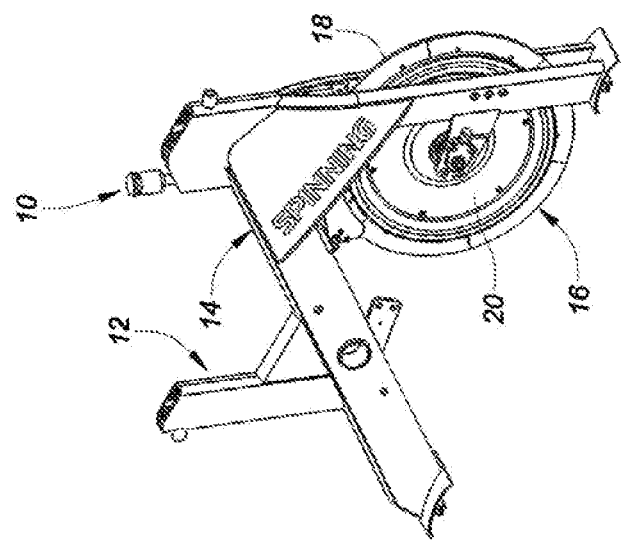
FIG. 10A shows the resistance system of FIG. 9A as used with an indoor cycle.
Figure 11:
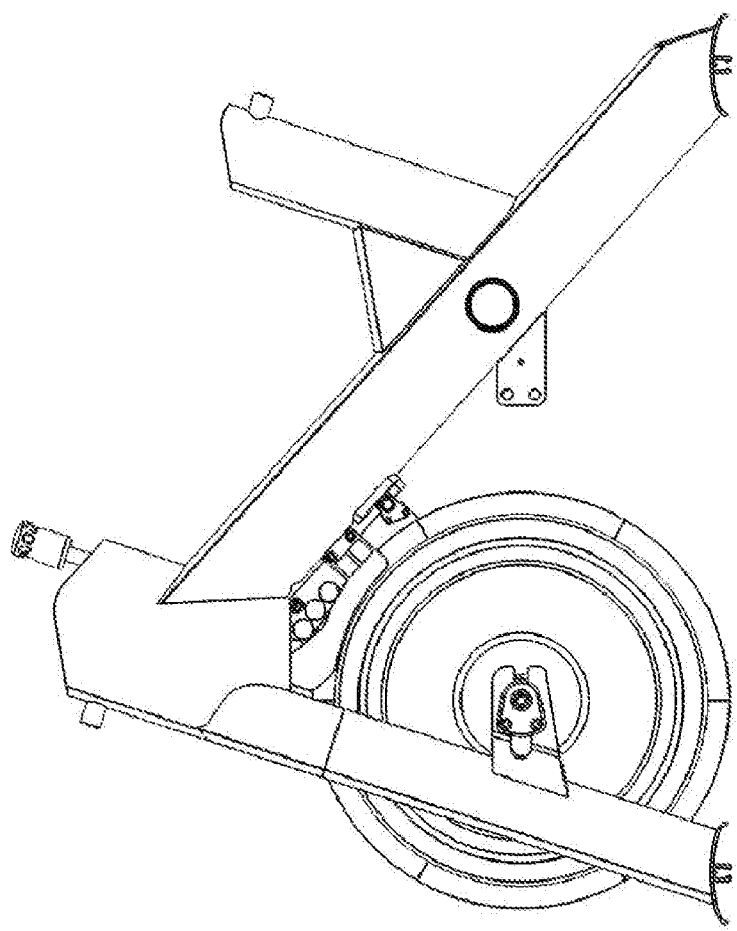
FIG. 11 is a left side view of the alternate embodiment with the movable arm in a first (raised) position.
Figure 12:
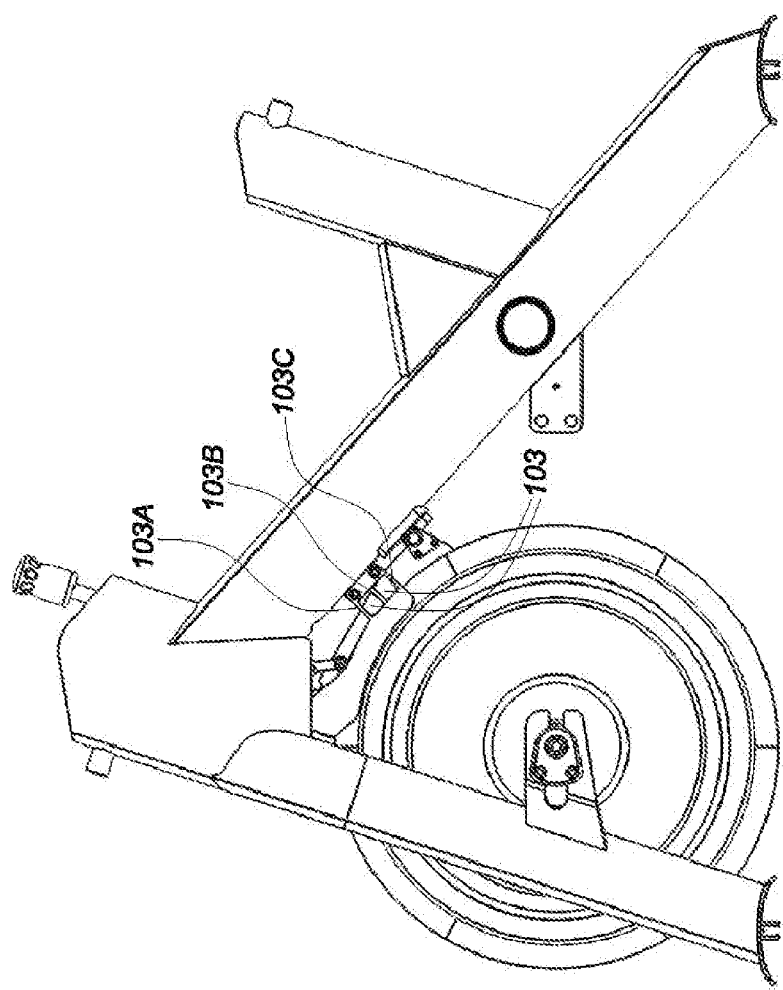
FIG. 12 is a left side view of the alternate embodiment with the movable arm in a second (lowered) position.
Figure 13:
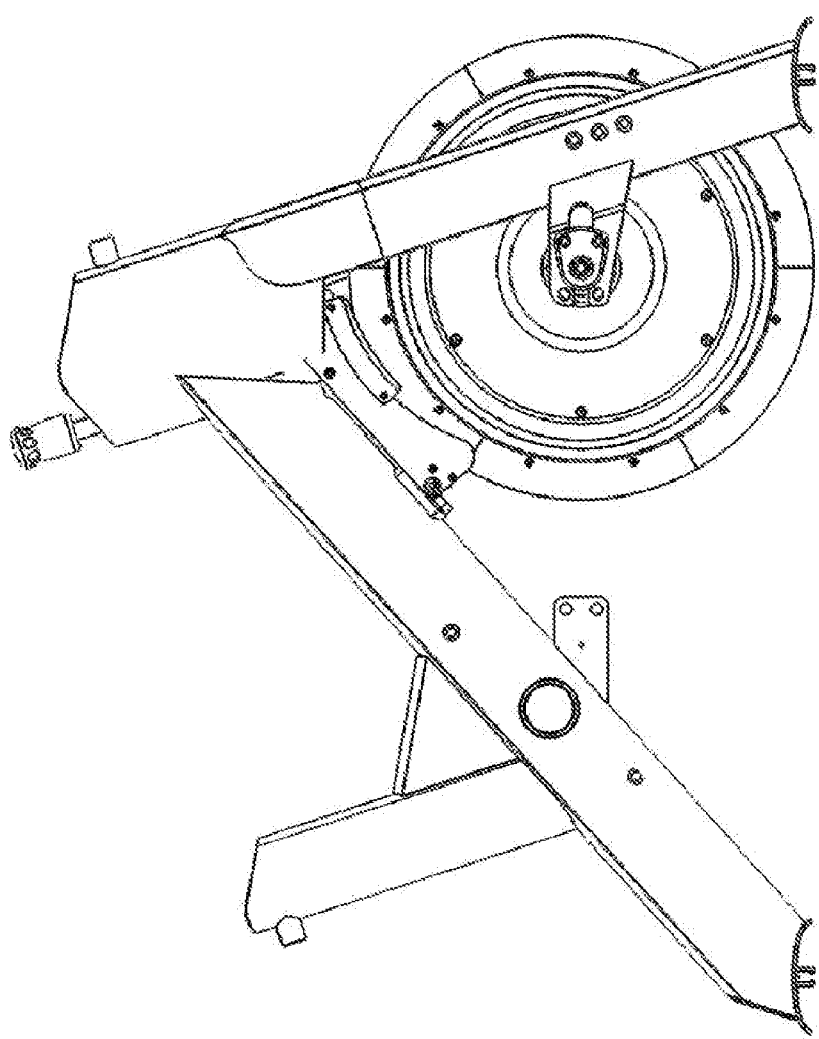
FIG. 13 is a right side view of the alternate embodiment with the movable arm in the first (raised) position.
Figure 14:
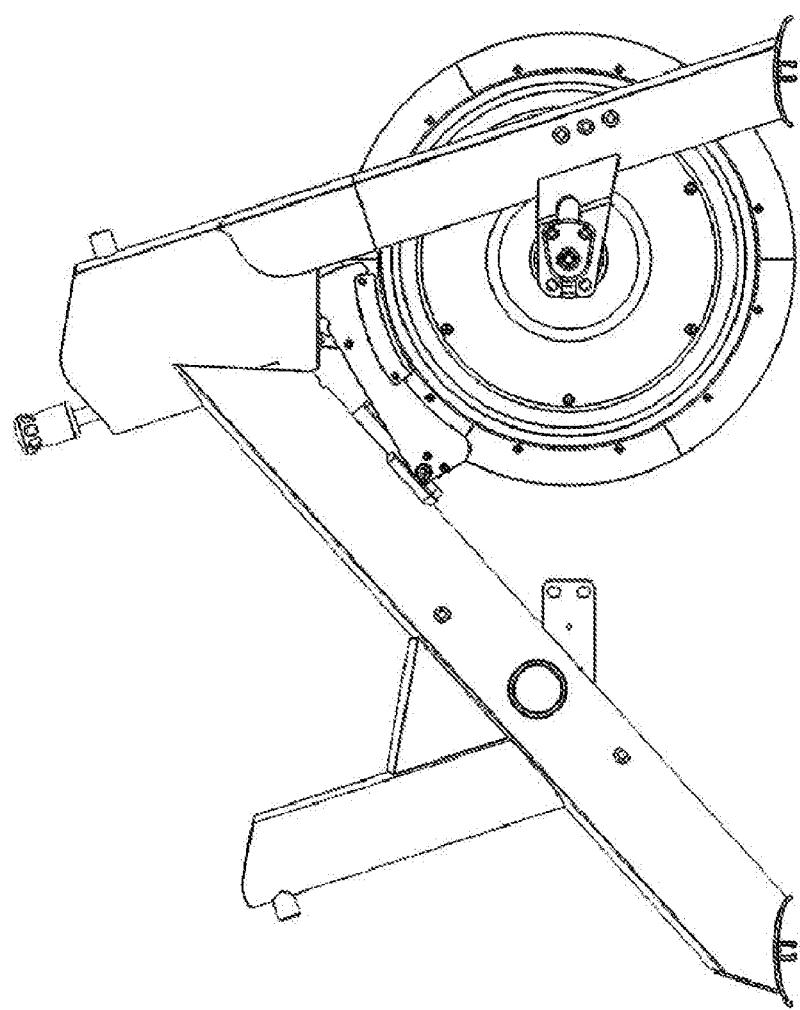
FIG. 14 is a right side view of the alternate embodiment with the movable arm in the second (lowered) position.
Figure 15:
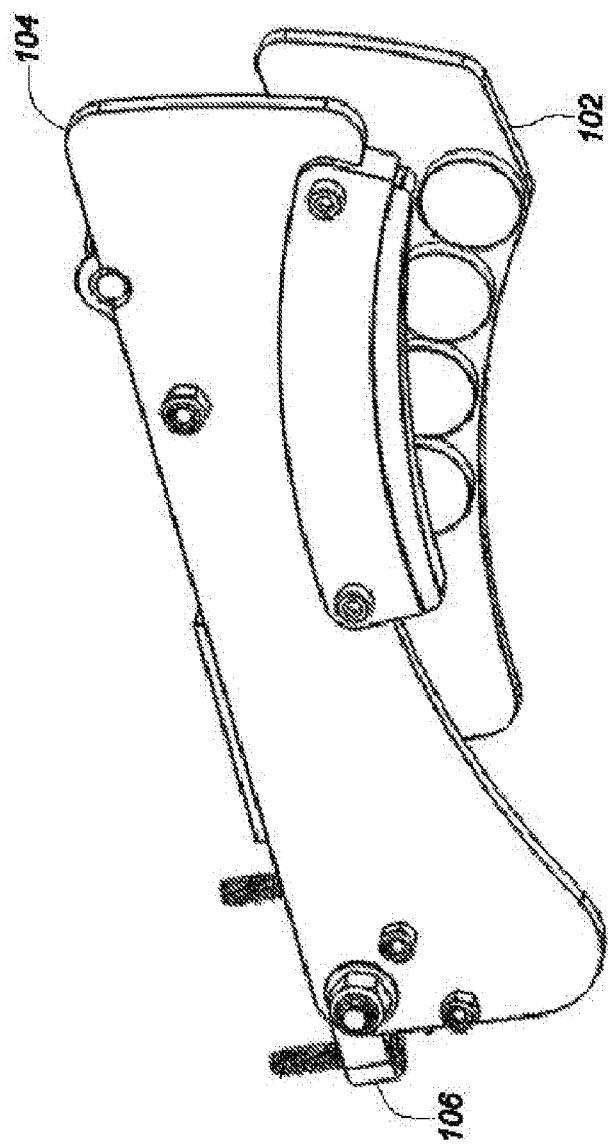
FIG. 15 is a bottom right perspective view of the alternate embodiment with the movable arm in the first (raised) position.
Figure 16:
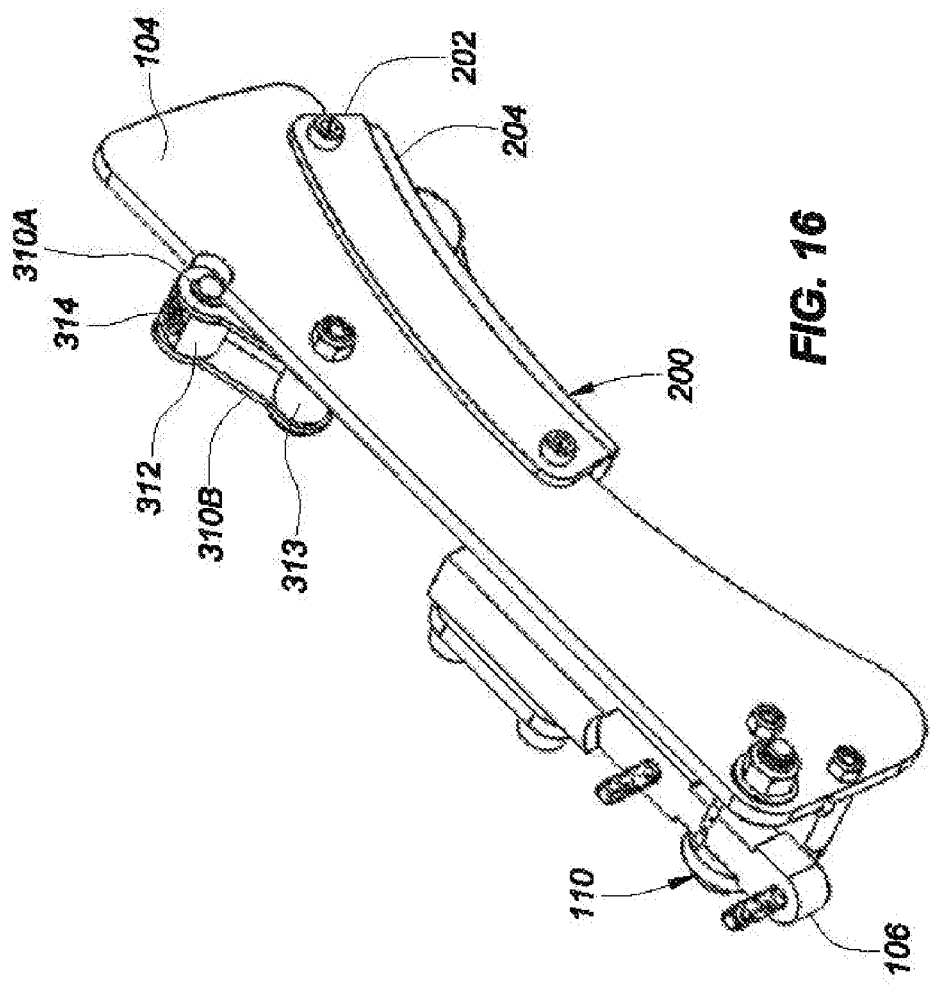
FIG. 16 is a top right perspective view of the alternate embodiment with the movable arm in the first (raised) position.

With reference to FIGS. 3, 4, and 10C, in a preferred embodiment, the flywheel 16 may be formed from two or more materials. An outer radial portion 18 of the flywheel 16 may be formed from a conductive, non-ferrous material, such as aluminum or copper, and an inner radial portion 20 of the flywheel 16 may be formed from a relatively dense material, such as steel. As described in more detail below, the outer radial portion 18 may comprise a relatively thin rim or circumferential member that passes by or between magnets when flywheel 16 rotates. And the inner radial portion 20 may be thicker to comprise the mass that allows flywheel 16 to provide inertial momentum to the pedal assembly through the direct drive.

Use of a conductive, non-ferrous material for the outer radial portion 18 of the flywheel 16, and a relatively dense material for the inner radial portion 20, of the flywheel 16 allows for the eddy current brake effect on the flywheel 16 via use of the magnets as described below, while allowing for a reasonably sized flywheel 16 for a desired flywheel inertial mass.

More specifically, in order to utilize a magnetic field to generate forces that resist rotation of the flywheel 16, the outer portion 18 of the flywheel 16 passing through the magnetic field is preferably formed from a conductive material. Non-ferrous conductive materials, such as aluminum, are preferred over ferrous conductive materials. However, using a denser material, such as steel, for the inner radial portion 20 provides the inertial momentum to facilitate a smooth transition from sitting to standing positions. As such, it is preferred that the flywheel 16 of the current invention comprise the inner and outer portions 18, 20 as described above to provide both functions.

With continued reference to FIGS. 3, 4 and 10C, a portion of the inner radial portion 20 of the flywheel 16 may transversely extend outwardly from the outer radial portion 18 on at least one side of the flywheel 16 thereby defining a radial ledge, shoulder or lip 22 where the inner radial portion 20 adjoins the outer radial portion 18. As described in more detail below, radial ledge, shoulder or lip 22 may form the surface on which brake assembly 200 may engage to slow or stop flywheel 16.

The outer and inner radial portions 18, 20 of the flywheel 16 may be joined together by any suitable fasteners or connection methods, such as screws or the like, welds, adhesives and the like, and any combinations thereof. Further, although the flywheel 16 is shown and described as formed from two materials, the flywheel 16 could be formed from a single material, such as aluminum or copper, or of three or more materials.

Referring again to FIGS. 1-4 and 10A-C, in one form, the resistance adjustment assembly 300 may be configured to be rotated in a clockwise or counterclockwise direction to thereby cause the resistance assembly 100 to increase or decrease the amount of resistance applied to the flywheel 16. For example, in one form, a user may turn the resistance adjustment assembly 300 in a clockwise direction to cause the resistance assembly 100 to be lowered thereby moving one or more magnets closer to the flywheel 16 in order to increase the resistance on the flywheel 16 by increasing the magnetic resistance field. Conversely, the user may turn the resistance adjustment assembly 300 in a counterclockwise direction to cause the resistance assembly 100 to decrease the resistance on the flywheel 16 by raising one or more magnets so that they are farther away from the flywheel 16 so that the magnetic resistance field is decreased.

Additionally, the resistance adjustment assembly 300 is preferably configured to be pushed generally downward or pulled generally upward to thereby cause the brake assembly 200 to apply a brake or emergency brake to the flywheel 16 and thereby slow, stop, and/or prevent its rotation. In a preferred embodiment, the brake assembly 200 is positioned so that it engages the ledge, shoulder or lip 22 of the flywheel 16 when a user may press down on the resistance adjustment assembly 300 to operatively engage the brake assembly 200 and thereby apply a brake to the flywheel 16. In this manner, the brake assembly 200 may advantageously be used as emergency brake to quickly slow or stop the rotation of the flywheel.

The variable resistance assembly 100 is now further described. As shown in FIGS. 1-10, the resistance assembly 100 may comprise a fixed arm 102 and a movable arm 104. One or both of arms 102, 104 may include one or more magnets 132 that may be attached to the inner surfaces of arms 102, 104. Magnets 132 may be attached to arms 102, 104 by any suitable means. In operation of the resistance system 10, the fixed arm 102 may remain in a generally fixed or rigid position relative to the frame 12 and the flywheel 16, and the moveable arm 104 may be moved through various positions relative to the flywheel 16 to thereby increase or decrease the resistance applied thereto.

Figure 2:
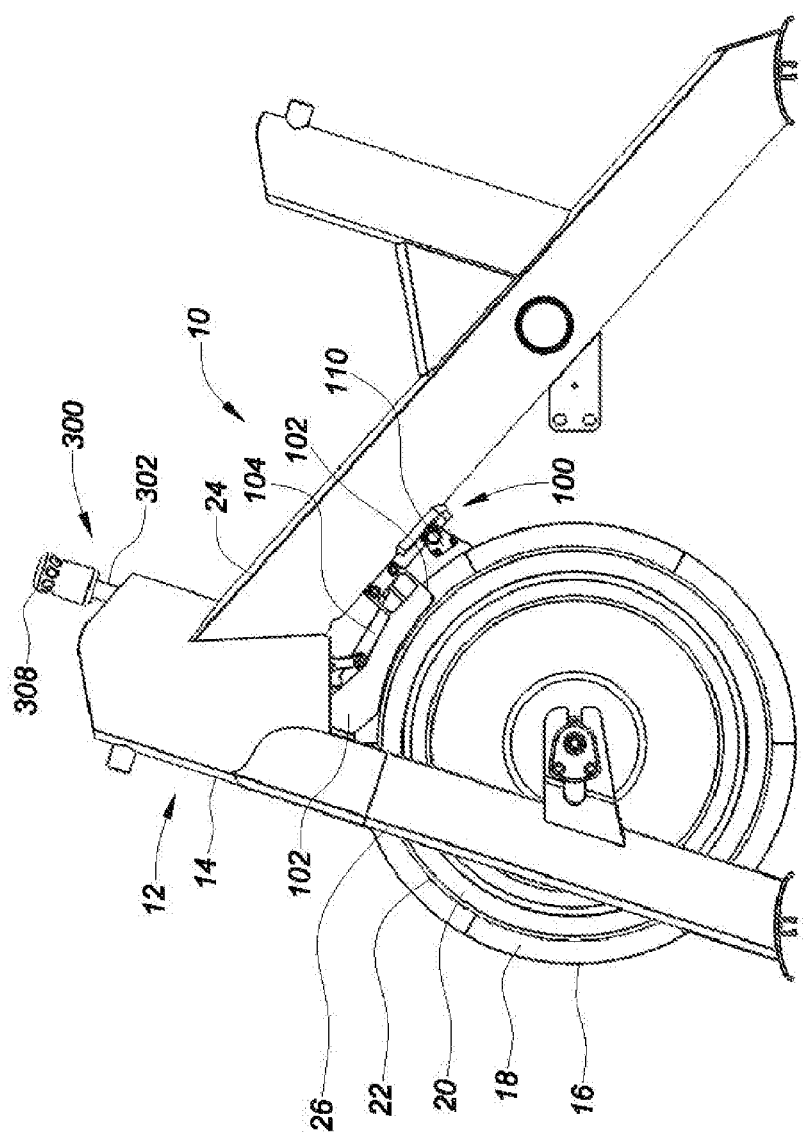
FIG. 2 shows another left side view of the resistance system of FIG. 1, with the resistance system shown in a second position relative to the indoor cycle, where the movable arm is positioned closer to the flywheel.

As can be seen in FIGS. 1 and 2, for example, the fixed arm 102 may be configured such that, in its fixed position, most of the fixed arm 102 and its one or more magnets 132 may be overlapping or positioned in proximity to a portion of the flywheel 16, in particular, the conductive outer radial portion 18. However, it is preferred that the amount of overlap or proximal placement is determined before fixing arm 102 to frame 14 of indoor cycle 12 in order to provide the desired magnetic braking force.

In contrast, the movable arm 104 and its one or more magnets 132 may be moved (for example by pivoting) to various positions, so that the amount of overlap or proximal placement of arm 104 and its magnet(s) 132 in relation to the flywheel 16 may be varied. For example, the moveable arm 104 may be positioned in a raised or upward position (as illustrated in FIGS. 1, 3, 10B and 15, for example), in which most of the moveable arm 104 is generally above or clear of (i.e. not overlapping) the flywheel 16. The moveable arm 104 may be moved (e.g., pivoted) to a lowered or down position (as illustrated in FIGS. 2, 4, 10C and 18, for example), in which more or most of the moveable arm 104 is overlapping the conductive outer radial portion 18 of the flywheel 16. It may also be moved (e.g., pivoted) to any position between.

Generally, positioning the movable arm 104 in a raised or up position may apply less resistance to the flywheel 16, and positioning the moveable arm 104 in the lowered or down position may apply more resistance to the flywheel 16. The moveable arm 104 may be moved to any position between the fully up position and fully down position to selectively provide any amount of desired resistance between the minimum and maximum amounts. The relative position of movable arm 104 relative to the flywheel 16 may be controlled by rotating the knob 308 of the resistance adjustment assembly 300.

A benefit of one arm 102 being fixed and one arm 104 being movable is that it may be simpler to operate, cost less to manufacture and may be more reliable. That is, the reduction in the number of moving parts may result in improved performance over time.

While the fixed arm 102 and moveable arm 104 may overlap a portion of the flywheel 16, it is preferred that they do not physically touch the flywheel 16. It is also preferred that the arms 102, 104 remain a desired distance apart and do not move towards each other that might occur due to the strong magnetic attraction between the magnets 132 on the respective arms 102, 104. As discussed later, brake guide shoe 130 may be mounted to the rear side of the head tube and engage the forward ends of arms 102, 104 thereby resisting their attraction. Rather, they are spaced apart from the overlapped portion of flywheel.

With reference to FIGS. 5-9, the resistance assembly 100 is now further described. The fixed arm 102 and moveable arm 104 may be coupled to the frame 14 of the cycle 12 via a mount 106. Mount 106 may comprise any suitable material such as steel or aluminum. Mount 106 may be coupled to the frame 14 such that the fixed arm 102 is positioned on one side of the flywheel 16 and the moveable arm 104 is positioned on the opposite side of the flywheel 16 (see FIGS. 1-4). Mount 106 may be attached to frame 14 via bolts (as shown) or other suitable attachment mechanisms. In this manner, resistance assembly 100 may be installed or removed as a unit to or from indoor cycle 12.

As illustrated in FIGS. 1-4, in a preferred embodiment, the mounting block 106 may be secured to the frame 14 on the underside of the down tube 24 posterior to the fork 26. This is advantageous because resistance assembly 100 may be generally located away from the rider so that it does not protrude into an area where the rider's legs may travel. This mounting location also provides a sleek appearance when compared to other magnetic braking systems that are attached to an indoor cycle's head tube or other location.

Figure 6:
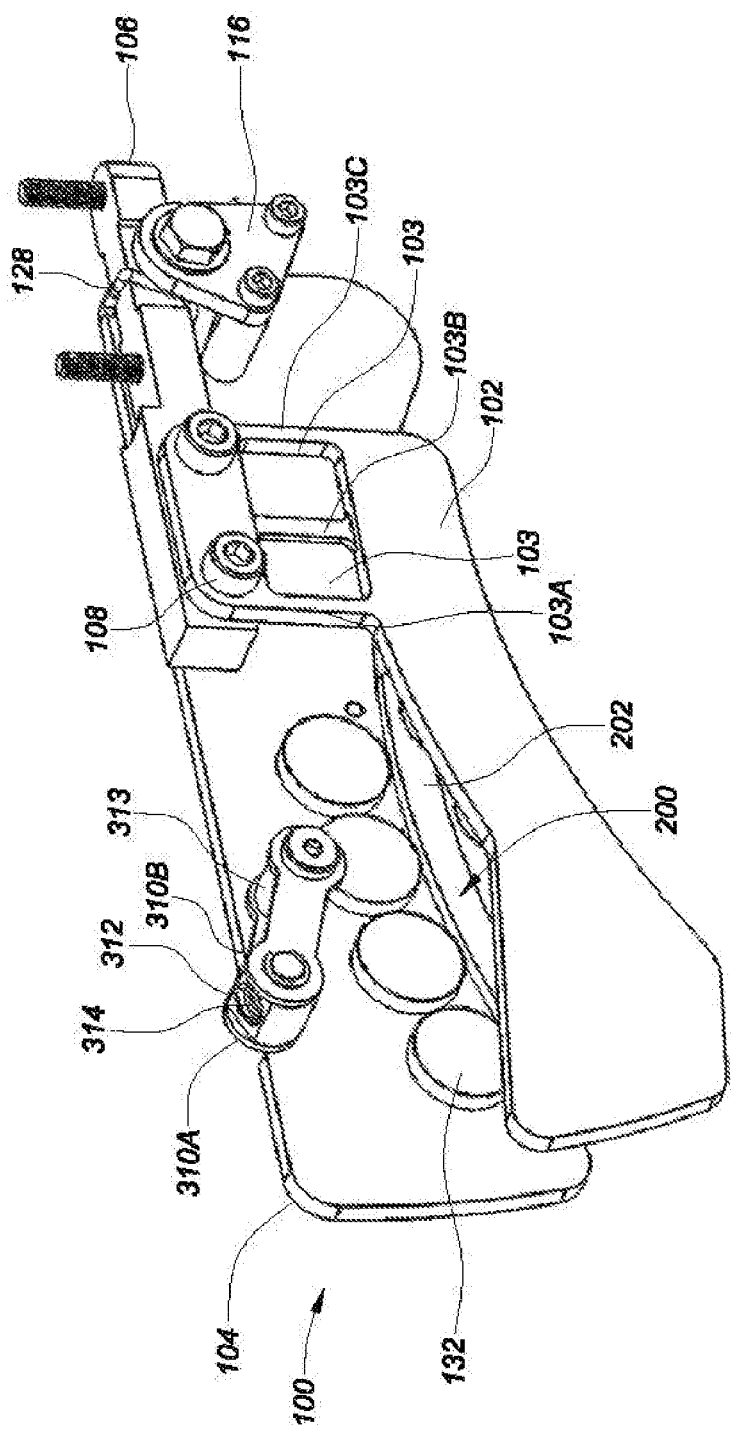
FIG. 6 shows a top left perspective view of the resistance assembly of FIG. 5 with the movable arm in the first position.
Figure 7:
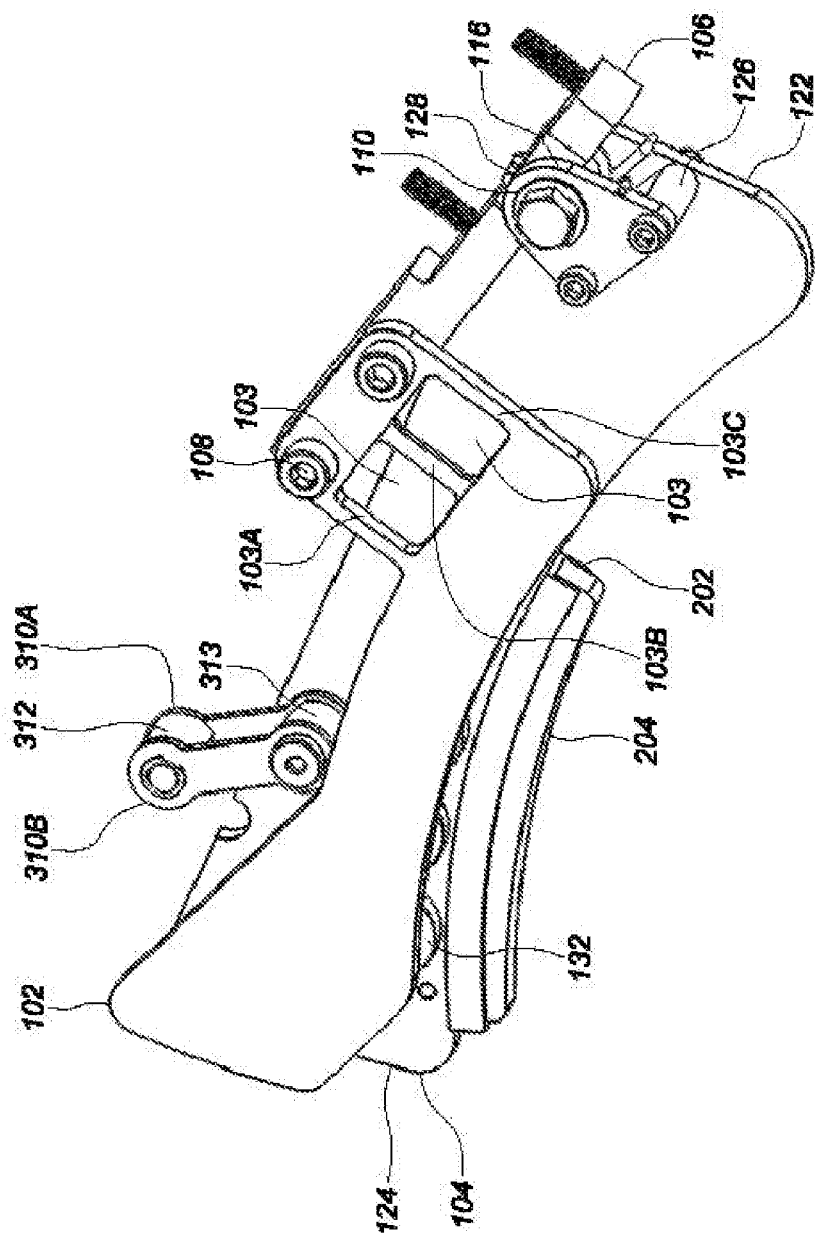
FIG. 7 shows a bottom left perspective view of the resistance assembly of FIG. 5 with the movable arm in a second (lowered) position.
Figure 8:
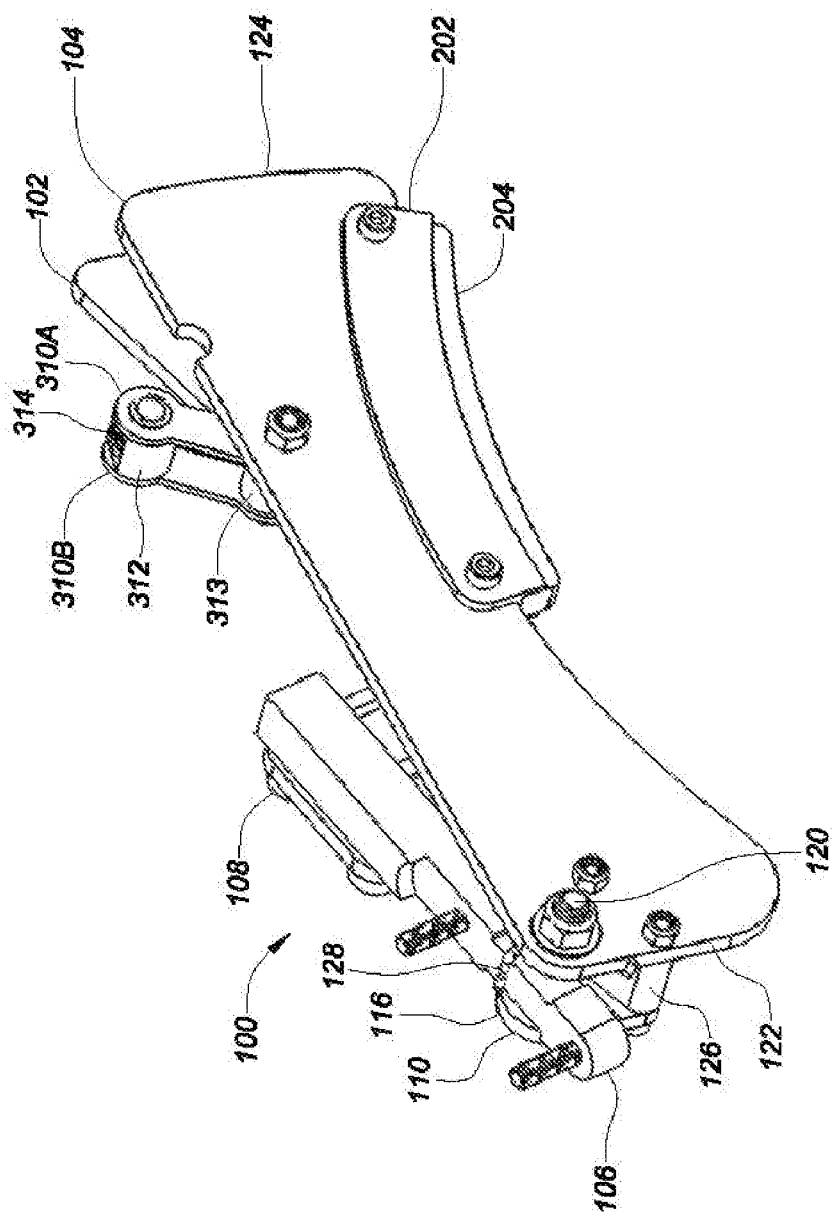
FIG. 8 shows a top right perspective view of the resistance assembly of FIG. 5 with the movable arm in the second (lowered) position.
Figure 17:
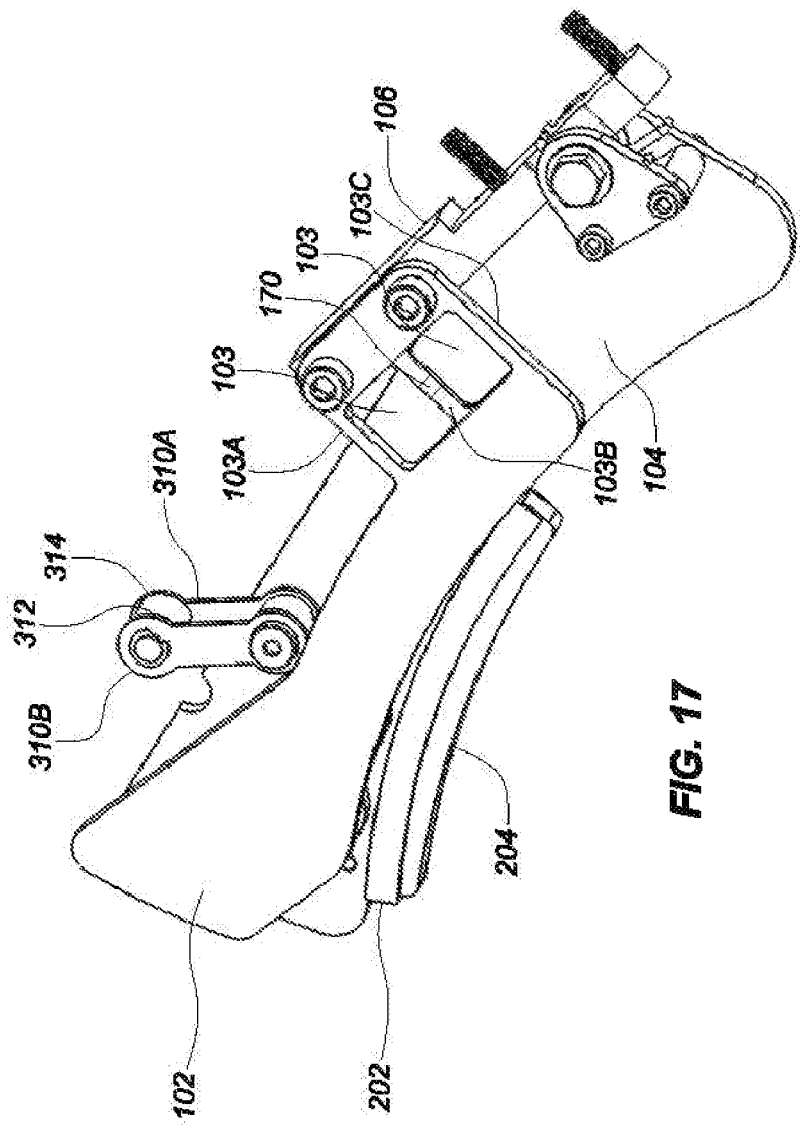
FIG. 17 is a left perspective view of the alternate embodiment with the movable arm in the second (lowered) position.
Figure 18:
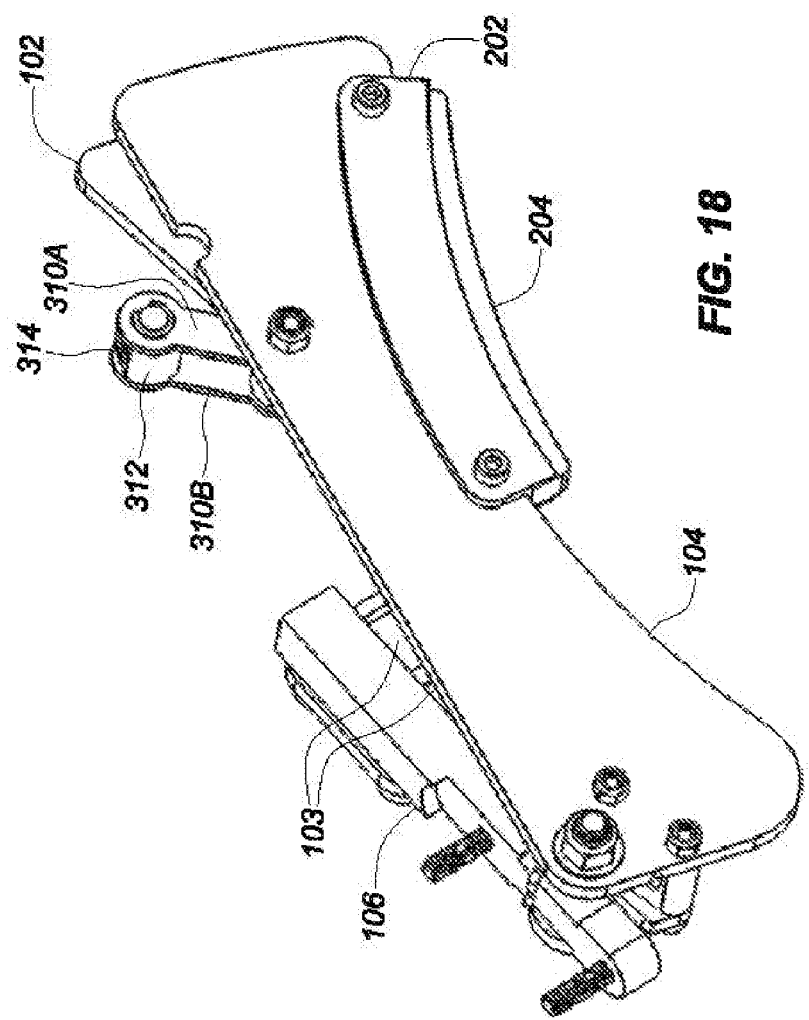
FIG. 18 is a right top perspective view of the alternate embodiment with the movable arm in a second (lowered) position.

As shown in FIGS. 6 and 7, the fixed arm 102 may be rigidly coupled to the mounting block 106, for example, via one or more bolts, screws or pins 108. Fixed arm 102 may be made of any suitable material such as steel or other stiff material that may position magnets 132. Fixed arm 102 may include one or more windows or cutouts 103 thereby creating vertical ribs 103A, 103B, 103C. As discussed later, a strain gauge 170 (as shown in FIG. 17) or other component may be included to measure the amount of strain or flex in brake arm 102 caused by the magnetic forces of resistance assembly 100. This strain measurement may then be processed by software to provide a measurement of the level of energy exerted by the user. In other words, this may provide a measurement of watts.

Figure 5:
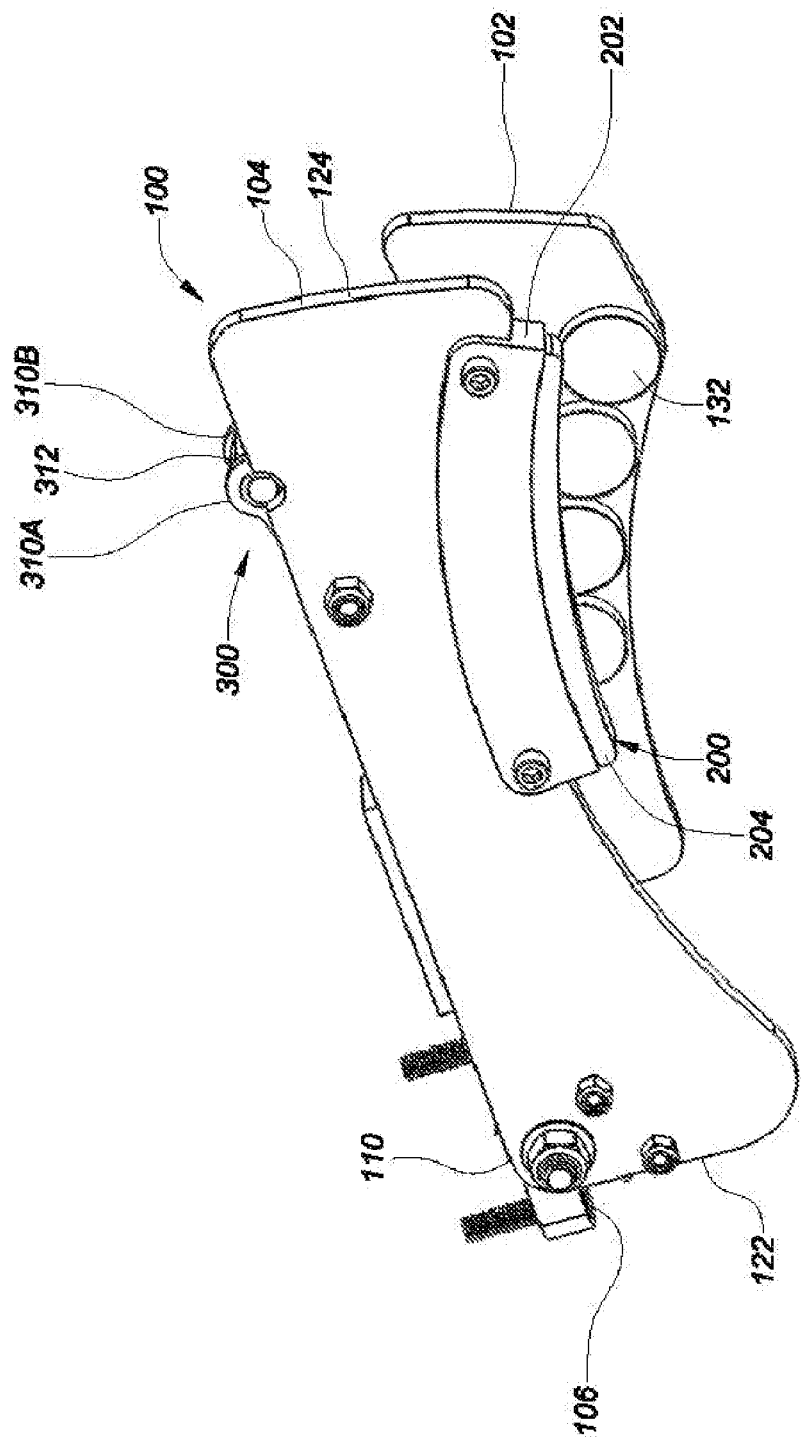
FIG. 5 shows a bottom right perspective view of a resistance assembly where the movable arm is in a first position.

Fixed arm 102 may include one or more magnets 132 as shown in FIG. 5. As discussed later, it is preferred that there be a corresponding magnet 132 on movable 104 for each magnet on fixed arm 102.

Moveable arm 104 may be moveably coupled to the mounting block 106. In a preferred embodiment, this may occur via a pivot assembly 110. As described later, movable arm 104 may also be coupled to arm 302 which may serve to raise and lower arm 104 about pivot assembly 110. Movable arm 104 may also made of any suitable material such as steel or other stiff material that may position magnets 132. Movable arm 104 may include one or more magnets 132 as shown in FIG. 5.

Pivot assembly 110 may be located at or near the rear or trailing end of moveable arm 104 and towards the rear of mount 106. In this manner, movable arm 104 may extend forward from pivot assembly 110 toward the front of cycle 12. This is in contrast to certain existing resistance systems that are mounted to the frame 14 in front of or anterior to the fork 26, with a front pivot and magnet arm(s) extending backwards toward the back of the cycle. Again, the mounting locations of the above-described components preferably isolate the assembly 100 away from the rider and provide a sleek or compact appearance.

The position of the pivot point and direction in which the arms extend from the pivot point relative to the rotating flywheel (i.e., front pivot with trailing arm(s) versus rear pivot forward extending arm(s)) may affect the direction of the force vectors generated thereby. For example, with a front pivot, trailing arm(s) design, the forward spinning flywheel 16 may create force vectors tending to push the magnetic arm away from the flywheel requiring a greater amount of force to overcome to increase the resistance or to apply the brake or emergency break.

In the current invention, however, it is preferred that the rear pivot 110 with forward extending movable magnetic arm 104 creates force vectors tending to pull the magnet arm 104 towards the flywheel 16, requiring less force from the user to selectively increase the resistance and to use the brake or emergency brake. But as described below, and as shown in FIG. 9B, the coupling between rod or arm 302 (with biasing member or spring torsion spring 128) and movable arm 104 prevents arm 104 from actually moving towards flywheel 16, to avoid an unintended increase in resistance.

As shown in FIG. 9B, pivot assembly 110 may include an axle pivot sleeve 112 that may reside in a hole in the mounting block 106, a first axle pivot opening 114 of the moveable arm 104, a pivot bracket 116 having a second axle pivot opening 118 formed therein, and a pivot member or axle 120 defining a pivot axis or pivot point. As illustrated in FIGS. 5-8, the pivot bracket 116 may be positioned on the opposite side of the mounting block 106 from the moveable arm 104. The first axle opening 114, the axle pivot sleeve 112, and the second axle pivot opening 118 are preferably in coaxial alignment so that the pivot member 120 may extend therethrough. Pivot member 120 may comprise a bolt, pin or other suitable component.

As illustrated in FIGS. 5-8, the moveable arm 104 has first and second ends 122, 124, with the first end 122 being in the rear and proximate to the mounting block 106, and the second end 124 being in the front. In one form, the first axle pivot opening 114 is formed at or near the first end 122 of the moveable arm 104 with the second end 124 being free to pivot downwardly or upwardly about the pivot axis of the pivot member 120 to thereby selectively cause relatively more or less of the movable arm 104 to overlap the outer radial portion 18 of flywheel 16 and thereby vary the resistance as desired.

In a preferred embodiment, the pivot assembly 110 may further include a spacer 126 coupled at one end to the moveable arm 104 and at the other end to the pivot bracket 116. Spacer 126 may serve to space apart the moveable arm 104 and pivot bracket 116 at a desirable distance.

The pivot assembly 110 may further include a biasing member 128, such as a torsion spring, which may resist pivoting of the moveable arm 104 that might otherwise occur due to any force vectors as discussed in more detail below. In a preferred embodiment, the biasing member 128 may be disposed around the pivot member 120 between mounting block 106 and pivot bracket 116.

A guideshoe 130 as shown in FIG. 9B is preferably positioned near the second or forward end 124 of the moveable arm 104 to provide a guide surface against which the second end 124 of the moveable member 104 may move upward and/or downward while pivoting. For example, guideshoe 130 may include a channel in which the forward end 124 of arm 104 may travel as it is raised or lowered. Guideshoe 130 may comprise nylon or other suitable material. Guideshoe 130 may be attached to the frame 14 of cycle 12 at, for example, on the posterior surface of the head tube. Guideshoe 130 may also engage the forward end of fixed brake arm 102 so that it does not bend toward the flywheel 16 or towards movable arm 104, especially when movable arm 104 is lowered and the magnets 132 of the respective arms 102, 104 more strongly attract each other. In this manner, the arms 102, 104 avoid contacting the flywheel 16. And their location between the head tube, down tube and flywheel 16 allows them to remain isolated or generally away from the rider and provide a sleek appearance.

As described above, the resistance system 10 of the current invention preferably uses magnetic resistance rather than frictional resistance. To this end, one or both of the fixed arm 102 and the movable arm 104 may have one or more magnets 132 coupled thereto. With reference to FIGS. 5 and 6, in one form, one or both of fixed arm 102 and movable arm 104 may be in the form of a plate with a suitable size and shape to accommodate at least a portion of the one or more magnets 132. The plates comprising arms 102, 104 may be generally rectangle shaped, but may also have curved edges to generally complement the curvature of the flywheel 16 or otherwise provide an appealing appearance. Although the shapes and sizes of fixed arm 102 and movable arm 104 are different in the illustrated embodiment, in other embodiments, they may be the same in shape and size.

To accommodate the one or more magnets 132, fixed and movable arms 102, 104 may include one or more magnet recesses or magnet channels having a size and shape configured for receiving at least a portion of one of the magnets 132. Alternatively, or in addition, arms 102, 104 may be formed of a conductive metal or other material that allows the magnets 132 to be magnetically coupled to the arm. In yet another form, magnets 132 may be coupled to the arm(s) using other suitable fasteners or connection methods such as friction fit connections, mechanical fasteners, adhesives, and the like, and combinations thereof.

The magnets 132 may be formed from rare earth elements or any other suitable magnetic material. The magnets 132 may be circular or any other suitable shape. Circular magnets are preferred in that they may result in a more spatially uniform positioning of the magnets 132 around the flywheel 16. When using more than one magnet 132 on one or both arms 102, 104, the magnets 132 may be positioned on that arm or arms such that the magnetic pole nearest the flywheel 16 alternates from North to South for each magnet 132 as shown in FIG. 5. Further, when using at least one magnet on each arm or arms, the magnetic pole of the magnet 132 facing one side of the flywheel may be opposite the pole of the magnet 132 facing the other side of the flywheel 16. In this manner, for the embodiment shown in the figures, the magnets 132 on one of the arms 102, 104 may be arranged in a NSNS configuration, while the opposing magnets 132 on the other of the arms 104, 1023 may be arranged in an SNSN configuration. Configuring the magnets 132 in this alternating manner as described may limit degradation in the resistance experienced by the flywheel 16 compared to configurations in which the poles of the magnets 132 are not positioned in an alternating arrangement.

The magnets 132 may be generally aligned on a linear or curved line. It is preferred that the magnets 132 may be generally aligned in a curved manner so that they are generally positioned at the same or similar distance from the outer portion 18 of flywheel 16.

The magnets 132 may be spaced relatively close to each other. This may allow that more magnets may be mounted on each arm 102, 104 to provide a sufficiently strong magnetic field to provide the desired range of resistances. The use of more magnets 132 may also create a larger increase and/or decrease in the resistance applied to the flywheel 16 as movable arm 104 is pivoted downward and/or upward.

As described above, it is preferred that the resistance assembly 100, and particularly, the pivot assembly 110, allows movement of only one arm, i.e., moveable arm 104, without altering the position of fixed arm 102. This is in contrast to existing systems, where generally, magnets on both sides of the flywheel are moved up and down during operation of the resistance assembly. As noted above, the movement of only one movable arm 104 advantageously allows a user to make smaller adjustments (i.e. better fine-tuning) to the resistance applied to the flywheel than is possible with existing systems where magnets on both sides of the flywheel move up and away from the flywheel or down and toward the flywheel in unison.

More specifically, the fixed arm/movable arm configuration allows the magnets to approach each other in a "scissoring" manner, so that the attractive force between magnets is a variable, keyed to the position of the movable magnet arm 104 relative to the fixed magnet arm 102. Because the disc/braking portion is non-ferrous, the magnets 132 of the fixed arm 102 have negligible if any braking effect on the flywheel 16 when the adjustable arm 104 is raised and the magnets are not aligned.

However, when movable arm 104 is lowered, the rearmost magnet 132 generally becomes aligned with the rearmost magnet 132 on fixed arm 102, then the next pair of magnets on arms 102, 104 become aligned, and so on until the front magnets on arms 102, 104 become aligned. As such, the increase of magnetic resistance occurs more gradually because the magnetic force associated with opposing pairs of magnets 132 sequentially occurs. Thus the design of the current invention allows a much more progressive increase of braking resistance as the adjustment knob is rotated to lower the adjustable arm, thus allowing much smaller incremental increases of resistance.

Beyond the foregoing, the decrease in moving parts by having arm 102 fixed preferably increases reliability and durability, and decreases cost and eases manufacturing.

The resistance adjustment assembly 300 is now further described. As indicated above, assembly 300 may serve to adjust the resistance applied to rotation of the flywheel 16 by lowering and/or raising movable arm 104 as follows. As the flywheel 16 rotates, the conductive outer radial portion 18 passes through a magnetic field generated by the magnets 132. This rotation of the flywheel 16 through the magnetic field creates a force that resists rotation of the flywheel 16.

As the movable arm 104 is lowered thereby increasing the amount of overlap between the magnets 132 and the conductive outer radial portion 18 of flywheel 16, the resistance applied to the rotation of the flywheel 16 by the magnetic field increases. An increase in the resistance applied to the rotation of the flywheel 16 requires the user to exert more energy to pedal in order to rotate the flywheel 16. The amount of overlap of the magnets 132 with the outer radial portion 18 of flywheel 16 may be increased or decreased by selectively by pivoting moveable arm 104 relative to the flywheel 16, for example, by using the resistance adjustment assembly 300.

With reference to FIGS. 1-4, 9A, 9B and 10A-C, the manner in which the resistance adjustment assembly 300 may operatively engage the resistance assembly 100 to adjust the resistance is now described in further detail. Generally speaking, the resistance adjustment assembly 300 operatively engages the resistance assembly 100 to cause the moveable arm 104 to pivot around pivot point 110 generally downwardly to increase resistance and/or generally upwardly to decrease resistance.

Figure 19:
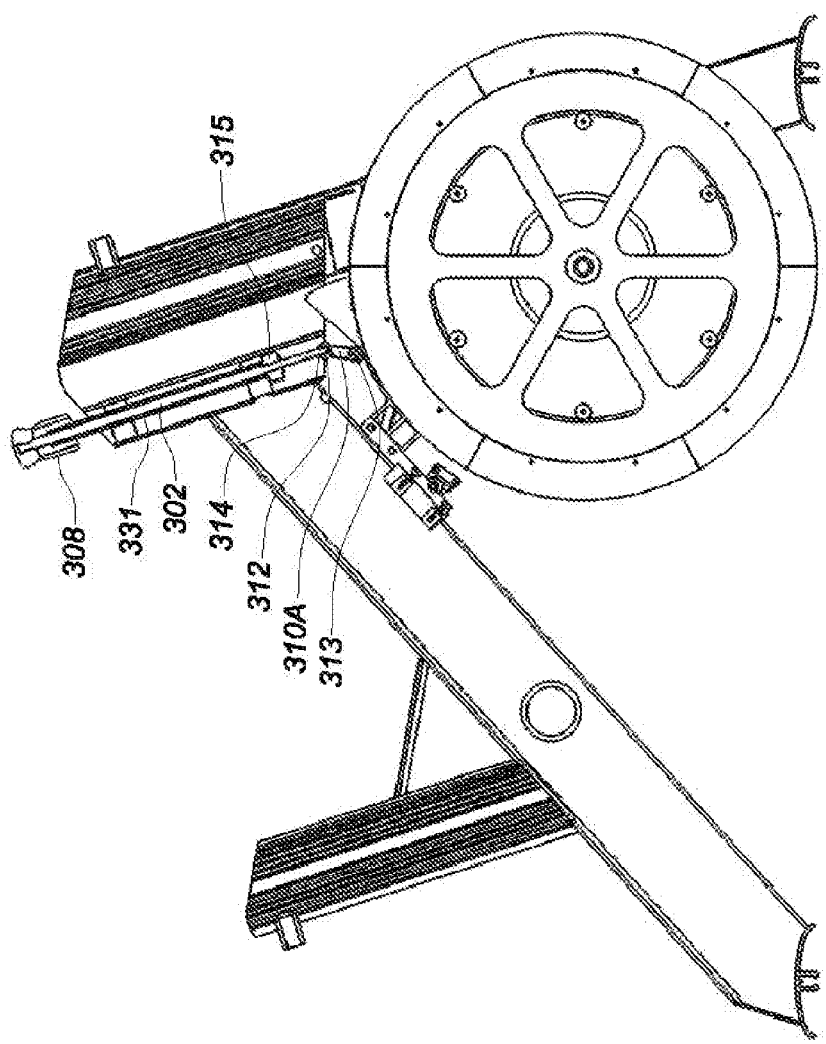
FIG. 19 is a right side partial sectional view of an indoor cycle showing the alternate embodiment of the resistance assembly and a resistance adjustment assembly.
Figure 20:
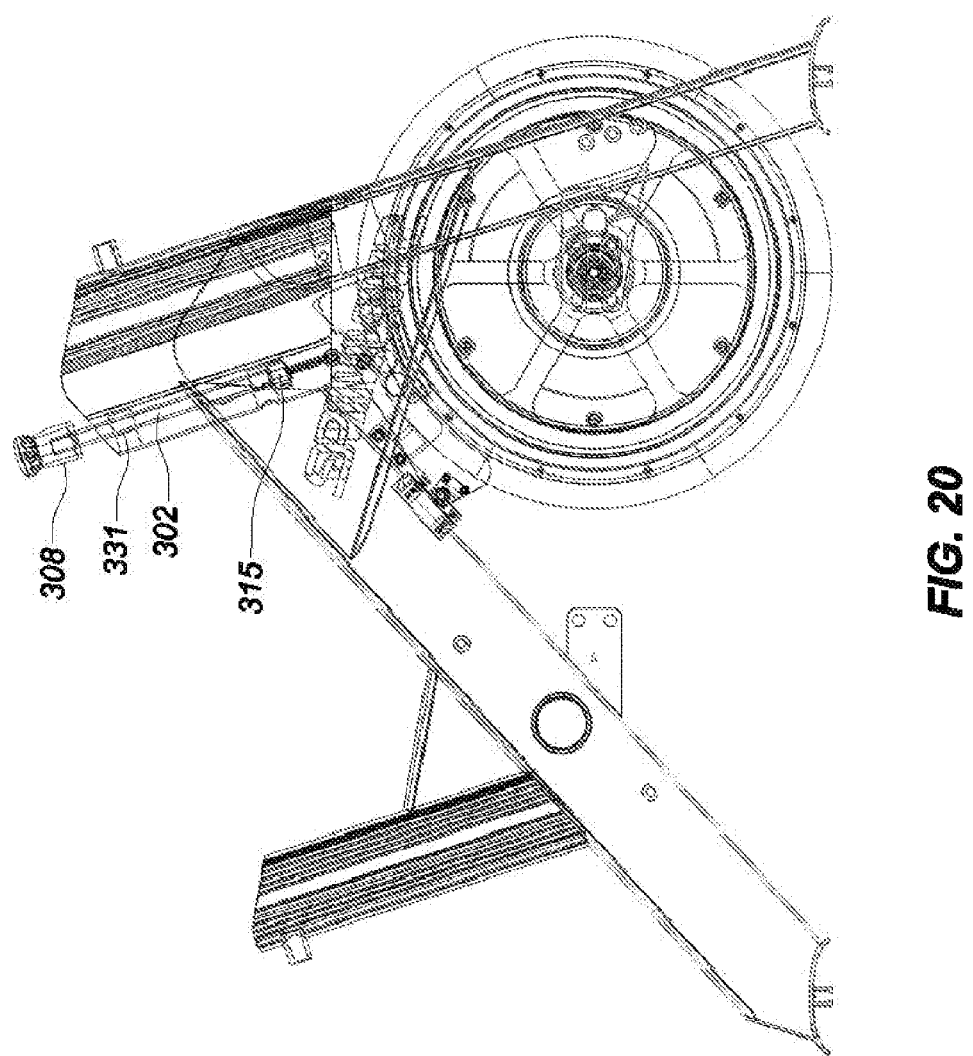
FIG. 20 is a right side view of an indoor cycle where the indoor cycle is shown as transparent so that components therein may be seen.

In a preferred embodiment, the resistance adjustment assembly 300 may include an adjustment rod 302 with a proximal end 304 closest to the user during operation and a distal end 306 that engages the resistance assembly 100. A resistance adjustment knob or handle 308 is preferably attached to the proximal end 304 of adjustment rod 302. Rod 302 preferably includes a threaded portion at its distal end 306, and is coupled to movable arm 104 as discussed below. As shown in FIGS. 19 and 20, rod 302 may extend through an interior hole 331 and may also extend through guide block 315 so that it extends in the desired direction towards resistance assembly 100.

Link arms 310A, 310B may be coupled to moveable arm 104 as shown in FIGS. 5-8 and FIGS. 16-18. Each link arm 310A, 310B may include a first end that is attached to arm 104 by a bolt, screw or other suitable fastener that allows link arms 310A, 310B to pivot relative to arm 104. Link arms 310A, 310B may also extend generally upwardly relative to the movable arm 104 and have a second upper end. Link arm spacer 312 may be located between the upper ends of link arms 310A, 310B and may serve to keep them positioned relative to each other. Link arm spacer 312 may be connected to link arms 310A, 310B through holes in the arms. It is preferred that spacer 312 may rotate relative to link arms 310A, 310B. In this link arms 310A, 310B preferably provide two pivot point(s), which allows the curvilinear motion of movable arm 104 to interface with the linear movement of rod 302.

Link arm spacer 312 may include a link arm bore or hole 314 that is preferably sized and configured to receive the distal end 306 of adjustment rod 302. To this end, link arm bore or hole 314 may include a threaded portion configured to threadably engage the threaded portion at the distal end 306 of adjustment rod 302.

Rotating knob 308 in one direction may cause adjustment rod 302 to rotate in that direction thereby causing an increasing portion of the threaded distal end 306 to be threaded through the link arm hole 314. This in turn exerts a generally downward force which may cause movable arm 104 to pivot downward gradually or incrementally, thereby incrementally increasing the amount of overlap with the flywheel, and thereby incrementally increasing the resistance. Conversely, selectively rotating knob 308 in the other direction may cause adjustment rod 302 to rotate in that direction thereby causing the threadable engagement with the link arm spacer 312 and its threaded bore 314 to be reversed. This in turn exerts a generally upward force on the movable arm 104 causing the arm to pivot upward incrementally, thereby decreasing the amount of overlap with the flywheel, and decreasing the amount of resistance.

Brake assembly 200 and its operation are now described in further detail with reference to FIGS. 3, 4, 5 and 10C. In a preferred embodiment, brake assembly 200 may be mounted to movable arm 104, and may include brake bracket 202 and brake pad 204. Brake bracket 202 may be attached to movable arm 104 by bolts, screws or other suitable attachment means. As shown in FIG. 5, for example, brake bracket 202 may comprise an L-shaped cross-section so that a portion of bracket 202 is positioned under the plate 124 of movable arm 104 while another portion of bracket 202 extends upward along plate 124 and is attached thereto. With this configuration, the brake assembly is solidly secured to arm 104 and may withstand the forces that may be associated with braking. Though the figures show one bracket 202 and brake pad 204, multiple brakes may be used.

The bottom portion of brake bracket 202 may be configured as an inverted U-shaped channel which may receive brake pad 204. In this manner, when brake pad 204 has worn down and needs replacement, it may be removed from the inverted U-shaped channel and replaced with a new pad 204.

Brake assembly 200 may operate as follows. In a preferred embodiment, the user may press down on knob 308 which causes adjustment rod 302 to move downward relatively quickly or abruptly. The downward movement of adjustment rod 302 may then exert an downward force on the movable arm 104 via the link arm spacer 312 and link arms 310A, 310B thereby causing the movable arm 104 to pivot downward quickly or abruptly (i.e., not gradually or incrementally) so that the brake pad 204 frictionally engages a portion of the flywheel (for example, the radial ledge 22) and quickly causes its rotation to slow down or stop.

To use the brake assembly 200, it is preferred that the user must press down on the knob 308 with enough force overcome the resistance from bias member 128 that resists rotation of the movable arm 104. Likewise, once the user releases the knob 308, the bias member 128 will cause the movable arm 104 to pivot upward so that the brake pad 204 is not in contact with the flywheel 16.

As illustrated in FIGS. 2 and 10C, as the brake pad 204 engages the flywheel 16, the magnets 132 on movable arm 104 will also be caused to further overlap the flywheel 16. Thus, in addition to the frictional force applied by the brake assembly 200 to the flywheel 16, the eddy current created by the resistance assembly 100 also help slow or stop the flywheel 16. Because of this additional eddy current resistance, the force that needs to be applied between the brake pad 204 and the flywheel 16 to slow down or stop the rotation of the flywheel 16 within a given amount of time or from a given speed of rotation may be less than the force that would be required using a friction brake alone.

An advantage of this brake or emergency brake assembly 200 is that it does not frictionally engage flywheel 16 on a continuous basis in connection with providing variable resistance. Instead, it is generally used when the user wants to slow or stop flywheel 16. Accordingly, its wear is preferably significantly reduced and it does not affect the adjustment of resistance provided by resistance assembly 100.

In this manner, the brake assembly may advantageously be used an as emergency brake when the user needs or wants to quickly slow down or stop the rotation of the flywheel rather than simply add resistance. This is a significant feature because even if the rider stops pedaling, the inertial momentum of the flywheel 16 will keep the pedals rotating through the direct drive. So if the user wants the pedals to stop, brake assembly 200 may be used.

The force vectors that are associated with the magnetic field provided by system 10 are now further described. Each magnet 132 may generally provide a force vector that is perpendicular to the line extending between the flywheel axle and the center of the magnet 132. It is preferred that the force vectors of magnets 132 cumulatively sum up to an overall force vector that tends to pull movable arm 104 towards flywheel 16 as opposed to pushing arm 104 away from flywheel 16. In other words, even if some force vectors associated with certain magnets 132 tend to push the movable arm 104 away from flywheel 16, there are force vectors associated with other magnets 132 that overcome any "pushing away" force vectors so that the overall force vectors of all magnets 132 used in system 10 tends to pull movable arm 104 towards flywheel 16.

With this configuration, the user may more readily use the brake assembly 200 to slow or stop flywheel 16 because in addition to the downward force applied by the user, the magnetic force pulling arm 104 towards flywheel 16 will assist in causing brake pad 204 to physically engage flywheel 16. Furthermore, this configuration may reduce the number of components in the overall system so as to reduce cost.

At the same time, it should be noted that an overall force vector that pulls movable arm 104 towards flywheel 16 would increase the resistance provided by system 10 if movable arm 104 were in fact allowed to be pulled toward flywheel 16. This could result in more resistance than the user intended. In order to address this, the biasing member 128 of the current invention preferably provides enough resistance to overcome or resist the downward force that the force vectors associated with magnets 132 may impart to movable arm 104. Accordingly, where biasing member 128 is a torsion spring, it is preferred that spring 128 exerts a force, or torque, that is larger or about the same as the cumulative force vectors associated with magnets 132.

The current invention is preferably configured so that the overall force vectors associated with magnets 132 tend to pull movable arm 104 towards flywheel 16. For example, the lengths of fixed arm 102 and/or movable arm 104 between their magnet(s) 132 and pivot position 110 may be increased. In this manner, the force vectors associated with each magnet 132 may generally be directed at a lower direction relative to pivot position 110 so that the cumulative force vector pulls the movable arm 104 towards flywheel 16.

As an example, an alternative embodiment of system 10 is now described with reference to FIGS. 11-18. As can be seen, the lengths of plates comprising arms 102, 104 are lengthened so that magnets 132 are positioned further away from pivot point 110. When considering the force vectors that are perpendicular to the line extending between the flywheel axle and the center of each magnet 132, it can be seen that the force vectors associated with each magnet 132 will tend to be directed relatively downward when compared with shorter plates for arms 102, 104.

With lengthened arms 102, 104, it is preferred that the biasing force provided by torsion spring or other biasing member 128 still overcome or is about equal to the overall force vector of magnets 132. In this manner, movable arm 104 preferably does not move towards flywheel 16 in order to avoid unintended increased resistance.

Referring to FIGS. 6, 7, 12, 17, 18 and 21, another aspect of the current invention regarding the measurement of the energy exerted by a user, e.g., a watts measurement is now further described. When the flywheel 16 rotates between the magnets 132 of arms 102 and 104, the magnetic force created will generally pull the arms 102, 104 forward. As the user pedals more vigorously causing the flywheel 16 to rotate faster, the magnetic force will increase thereby increasing the pulling force on arms 102, 104. The pulling force will cause arms 102, 104 to flex, and the amount of flex may be measured in various ways, which measurement may then be processed by software to provide the user with a watts measurement. Thus, as the user riders faster, the flywheel 16 will rotate faster, and the fixed arm 104 will flex more resulting in a higher measurement.

In a first embodiment of the watts measurement system as shown in FIGS. 6, 7, 12, 17 and 18, fixed magnetic arm 102 may include windows or cutouts 103 thereby created vertical ribs 103A, 103B, 103C. Strain gauge 170 or other component that may measure flex may be attached to any of ribs 103A, 103B, 103C. It is preferred that ribs 103A, 103B, 103C are sufficiently thin so that they will appreciably flex and allow strain gauge 170 to detect a strain measurement. As noted above, the strain measurement may be processed by software so that a watts measurement may be provided to the user. It is preferred that this measurement is more accurate than those provided on other exercise equipment.

With the configuration of fixed arm 104 as attached to mount 106, a virtual 4-bar linkage may be created, such that when braking forces are activated by aligning the two arms 102, 104, the force vector on the fixed arm 104 tends to draw the magnet or forward end of the fixed arm forward, thus causing minute amounts of flex in those vertical ribs, essentially the same as if there was a true 4-bar linkage. In a preferred embodiment, strain gauge 170 may be mounted on the center rib 103B, but side ribs 103A, 103C may also be used as mounting locations. Regardless of the location of gauge 170, changes in deflection would be measured, which could then be exported and modified via a software algorithm to arrive at a watt measurement.

An alternative embodiment of a watt measurement would be to instead have a load cell that is mounted fixed to the frame or other fixed location but adjacent to a vertical rib 103A, 103B, 103C, so that arm deflection could be measured in that manner.

Figure 21:
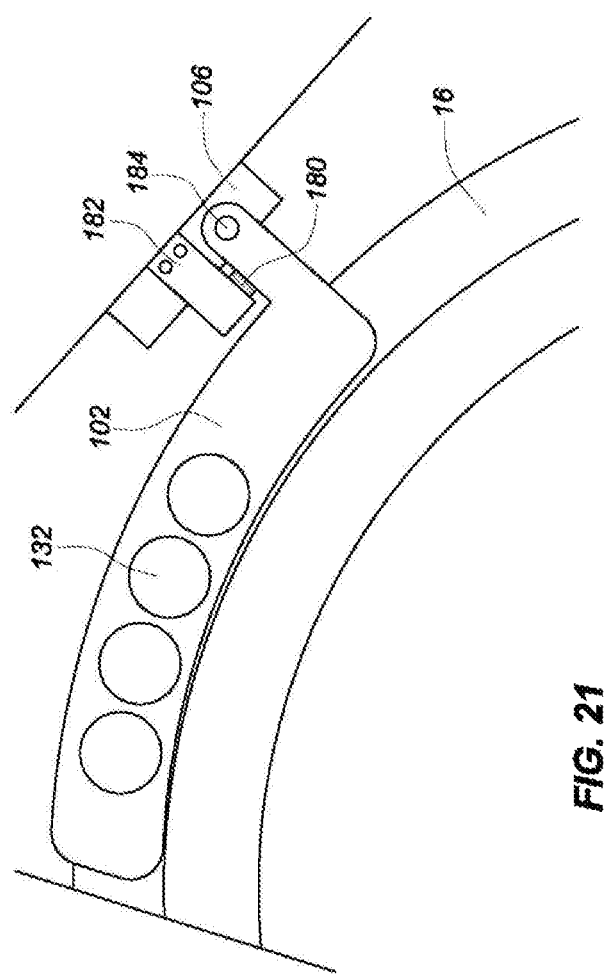
FIG. 21 is a left side view of a system to measure watts including a load cell.

An alternative embodiment of watt measurement is now described with reference to FIG. 21. In this embodiment, load cell 180 may again be mounted to a fixed location such as rigid plate 182 that may in turn be mounted to the frame of the exercise equipment. As the flywheel 16 rotates, the forward magnetic force may cause the arm 102 to move forward, thereby depressing a button into the load cell or otherwise compressing on the load cell. The amount of deflection experience by load cell 180 may be measured, and then processed by software to provide watt measurement. This embodiment may involve fixed arm 102, but as shown, pivot point 184 may be included which may provide a slight amount of movement by fixed arm 102 to allow an appreciable amount of deflection to occur so as to be measurable.

It should be noted that the embodiments of resistance system 10 as described above with relation to exercise cycle 12, may also include other embodiments of the flywheel, the resistance assembly, the brake assembly, the resistance adjustment assembly and other assemblies and components for use with cycle 12. To this end, additional embodiments are now described, but the descriptions above regarding magnetic resistance, the various components and assemblies and the functionality thereof, the force vectors associated with the system, and the benefits of such a system generally apply to the additional embodiments described below. For this reason, and to reduce unnecessary repetition within this specification, some of these details may not be repeated with the additional embodiments, but will still apply.

Another embodiment involving a flywheel 30 with two fins to engage magnets and a resistance assembly 400 that includes a single arm is now described with reference to FIGS. 22-29 Flywheel 30 is first discussed with reference to FIGS. 22-24 and then resistance assembly 400 is described with reference to FIGS. 25-29.

Figure 22:
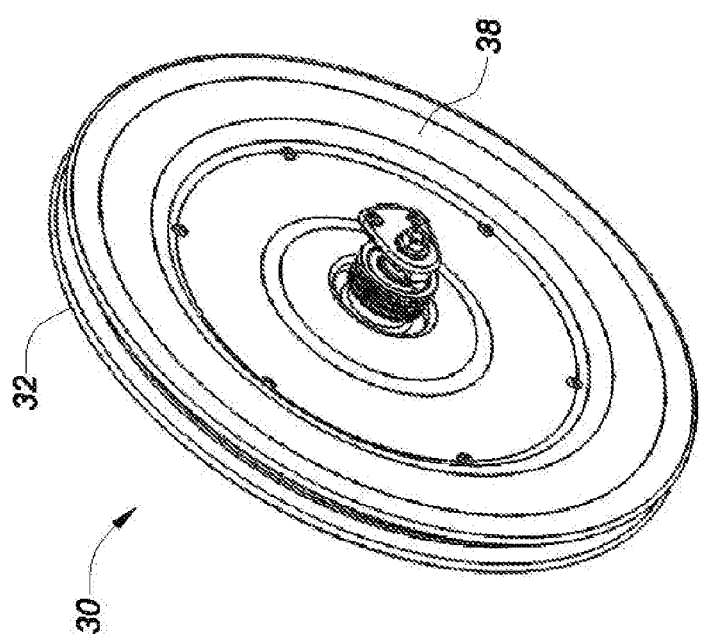
FIG. 22 shows a flywheel with an inner radial element and an outer radial element.
Figure 23:
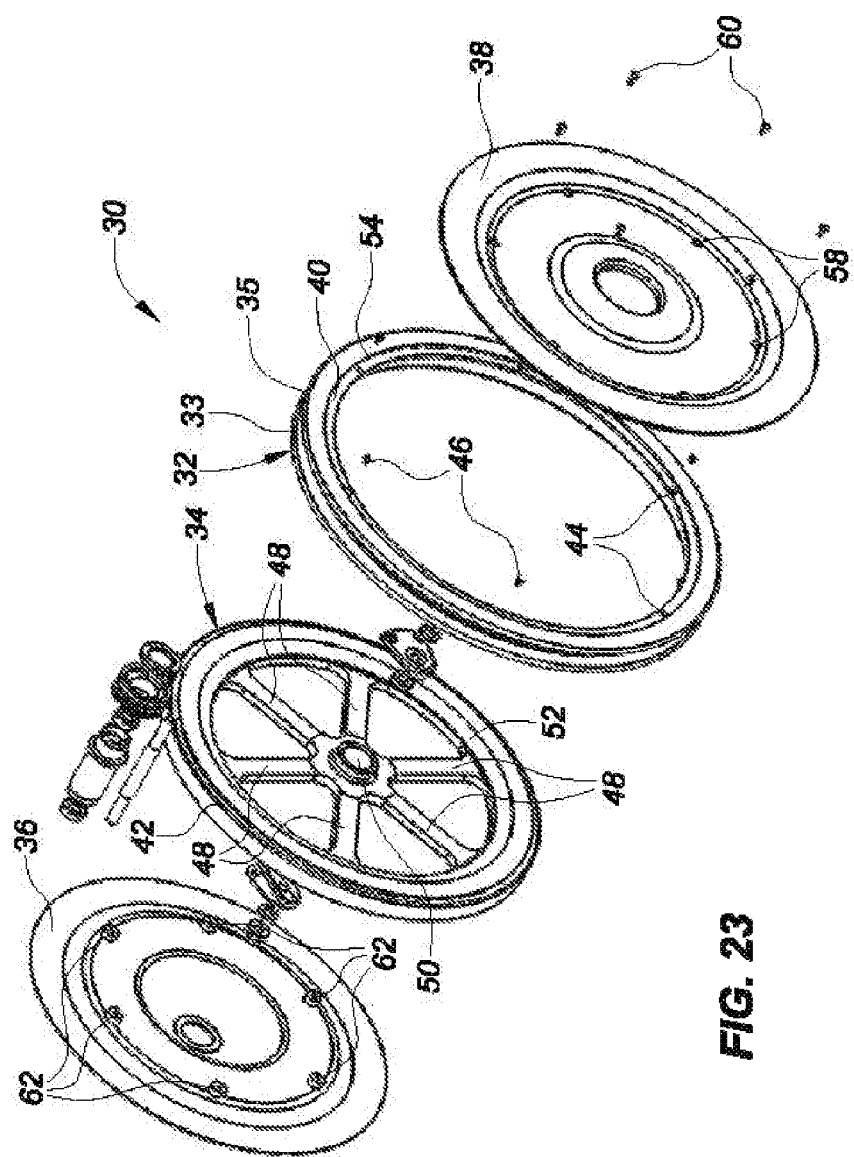
FIG. 23 shows an exploded view of a flywheel with an inner radial element, an outer radial element, a left support shield and a right support shield.
Figure 24:
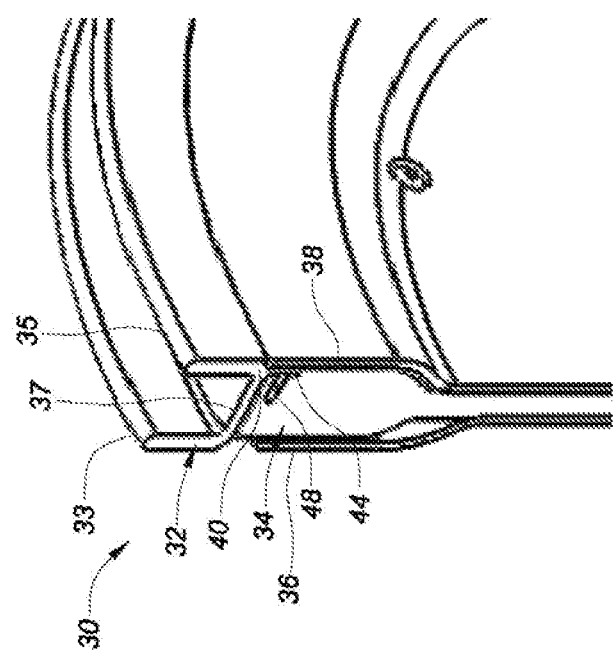
FIG. 24 shows a cutout view of a flywheel with an inner radial element, an outer radial element, a left support shield, a right support shield and upward extending disks.

As shown in FIGS. 22-24, flywheel 30 may include outer radial element 32, inner radial element 34, left radial support shield 36 and right radial support shield 38. As with flywheel 16 described above, flywheel 30 may be configured with exercise bike 12 and may be utilized with resistance system 10 that may include a magnetic or eddy current brake system, also referred to as a magnetic resistance system, to provide resistance to the rotation of flywheel 30 while in use.

Flywheel 30 may include outer radial element 32 that may be formed from a conductive, non-ferrous material, such as aluminum or copper, and inner radial element 34 that may be formed from a relatively dense material such as steel. Outer radial element 32 may comprise an upper surface and at least one rim that may pass by magnets when flywheel 30 rotates in order to create an eddy current braking effect that may apply resistance to the rotation of flywheel 30. Use of a conductive, non-ferrous material for outer radial element 32 of flywheel 30, and a relatively dense material for inner radial element 34, of the flywheel 30 may allow for the eddy current brake effect on flywheel 30 via use of magnets as described below, while allowing for a reasonably sized flywheel 30 for a desired flywheel inertial mass. Furthermore, the weight of inner radial element 34 may provide inertial momentum to facilitate the rider's transition between sitting and standing positions.

Inner radial element 34 may include spokes 48 that may extend outwardly from center axle section 50 to circumferential or outer radial section 52. Spokes 48 may be formed from relatively dense and strong material such as steel and may provide radial support to inner radial element 34 and to flywheel 30 as a whole. While FIG. 23 depicts the use of six spokes 48, other numbers of spokes may be utilized. Alternatively, inner radial element 34 need not include spokes but may instead comprise a solid structure that generally extends radially from axle section 50 to outer radial section 52. In addition, any structure that extends radially from the axle section 50 to outer radial section 52 may include solid sections as well as holes or gaps of various shapes, sizes and patterns.

Center axle section 50 may include bearing(s) or other suitable component that allow flywheel 30 to spin freely in a stable and well-balanced manner. These elements may also include a center axle rod, axle bearings, spacers, pads, lubrication and other suitable components.

As noted above, flywheel 30 may include outer radial element 32, inner radial element 34, left radial support shield 36 and right radial support shield 38. The outer diameter of inner radial element 34 may be less than the inner diameter of outer radial element 32 such that inner radial element 34 may fit within the inner diameter of outer radial element 32. It is preferred that elements 32, 34 fit snugly together and/or are separated by a relatively small gap.

In addition, as shown in FIGS. 23 and 24, inner radial element 34 may include notch 42 that may be configured to accommodate support lip 40 that may extend inwardly from outer radial element 32. While FIGS. 23 and 24 show the lip 40 and notch 42 as being generally configured on the right side of the inner radial element 34 and outer radial element 32, support lip 40 and notch 42 may be configured on the left side radial element 32, 34 or anywhere therebetween. It is preferred that lip 40 fits flush within notch 42 so that the outer right surface of inner radial element 34 also aligns flush with the outer right surface of outer radial element 32 where the surfaces butt up against each other. It is preferred that the interface between lip 40 and notch 42 be relatively contiguous and/or snug to help the attachment of right radial shield 38 as described below.

To secure radial elements 34, 32, support lip 40 may include holes 44 through which screws 46 may pass. In addition, notch 42 may include holes 48 that may receive screws 46. It is preferred that this threaded engagement adequately secures radial elements 34, 32. Accordingly, with inner radial element 34 configured within the inner diameter of outer radial element 32, with support lip 40 aligned within notch 42, and screws 46 passing through holes 44 and into holes 48 and screwed tightly, inner radial element 34 may be held securely within outer radial element 32. Holes 44 may be counter-sunk to allow the heads of screws 46 to fit flush with the counter-sunk area of holes 44 such that the outer right surface of lip 40 is smooth and free of sharp edges. While FIG. 23 shows the use of six screws 46 utilized to secure the inner radial element 34 within the outer radial element 32, other numbers of screws may be used. In addition, other fastening methods such as welding, rivets, clamps, clips or other fastening methods maybe used to secure these elements together.

With inner radial elements 34, 32 secured as described above, left radial support shield 36 and right radial support shield 38 may be attached to radial elements 34, 32 subassembly. As shown in FIG. 23 and FIG. 24, outer radial element 32 may include circumferential notches 54 on the left and right sides that may align to accommodate left support shield 36 and right support shield 38, respectively. It is preferred that shields 36, 38 are received by notches 54 so that the exposed surfaces are flush. To secure left shield 36 and right shield 38 in the positions described above, right shield 38 may include holes 58, and left shield 36 may include holes 62, to receive screws 60. Holes 62 may be threaded so that screws 60 may screw securely into holes 62 and be held secure.

Accordingly, left shield 36, right shield 38, inner radial element 34 and outer radial element 36 may be assembled together to form flywheel 30 as depicted in FIG. 22. It should be noted that left shield 36 and right shield 38 may allow for flywheel 30 to be more aerodynamic while providing additional radial support to the flywheel 30, as well as may assist in keeping debris from the inner workings of the axle section 50. While FIG. 23 shows the use of six screws 60 utilized to secure the left shield 36 and right shield 38 to the inner radial element 34 and outer radial element 32 combination, other numbers of screws may be used. In addition, other fastening methods such as welding, rivets, clamps, clips or other fastening methods maybe used to secure these elements together.

Outer radial element 32 of flywheel 30 is now further described. Radial element 32 may include a left upward extending circumferential lip or disk 33 and a right upward extending circumferential lip or disk 35. Inner circumferential surface 37 may be formed between upward disks 33, 35.

Upward disks 33, 35 may form the non-ferrous elements with which magnets may interact to provide resistance. This configuration of flywheel 30 may be used with the magnetic resistance system 10 as described above, e.g., with resistance assembly 100, brake assembly 200 and resistance adjustment assembly 300 described above.

However, this configuration of flywheel 30 may also be particularly suited for use with the additional embodiments discussed in detail below.

Figure 25:
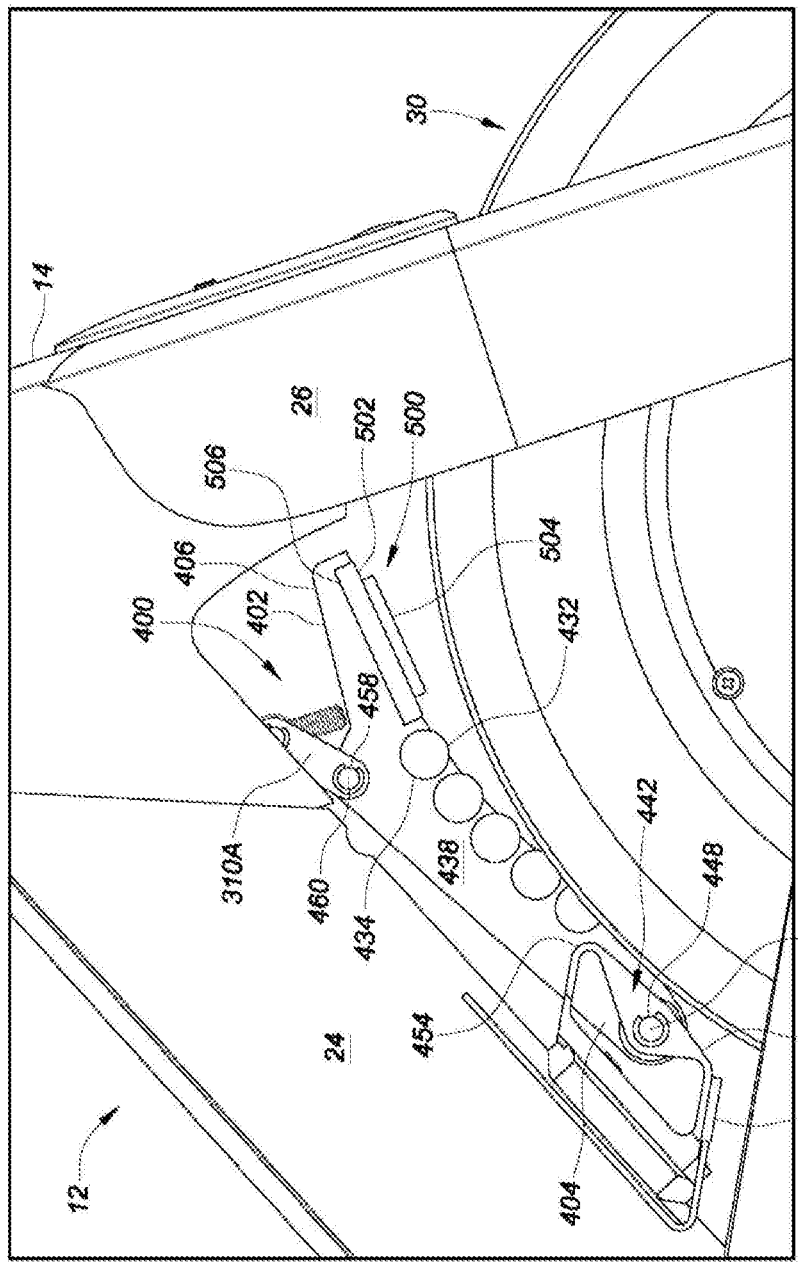
FIG. 25 shows a side view of a resistance system with a moveable arm in a generally upward position in accordance with an additional embodiment of the current invention.
Figure 26:
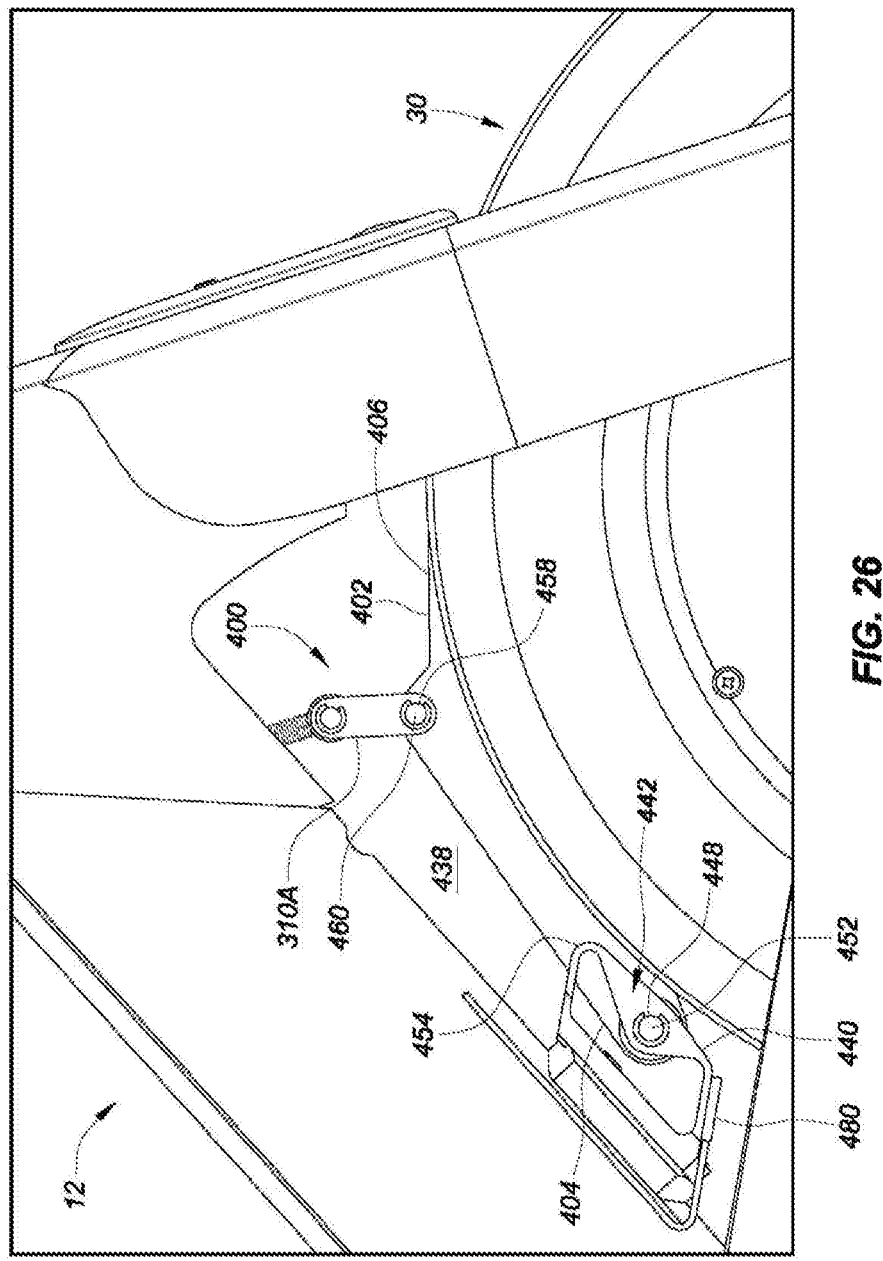
FIG. 26 shows a side view of a resistance system with a moveable arm in a generally downward position in accordance with an additional embodiment of the current invention.
Figure 27:
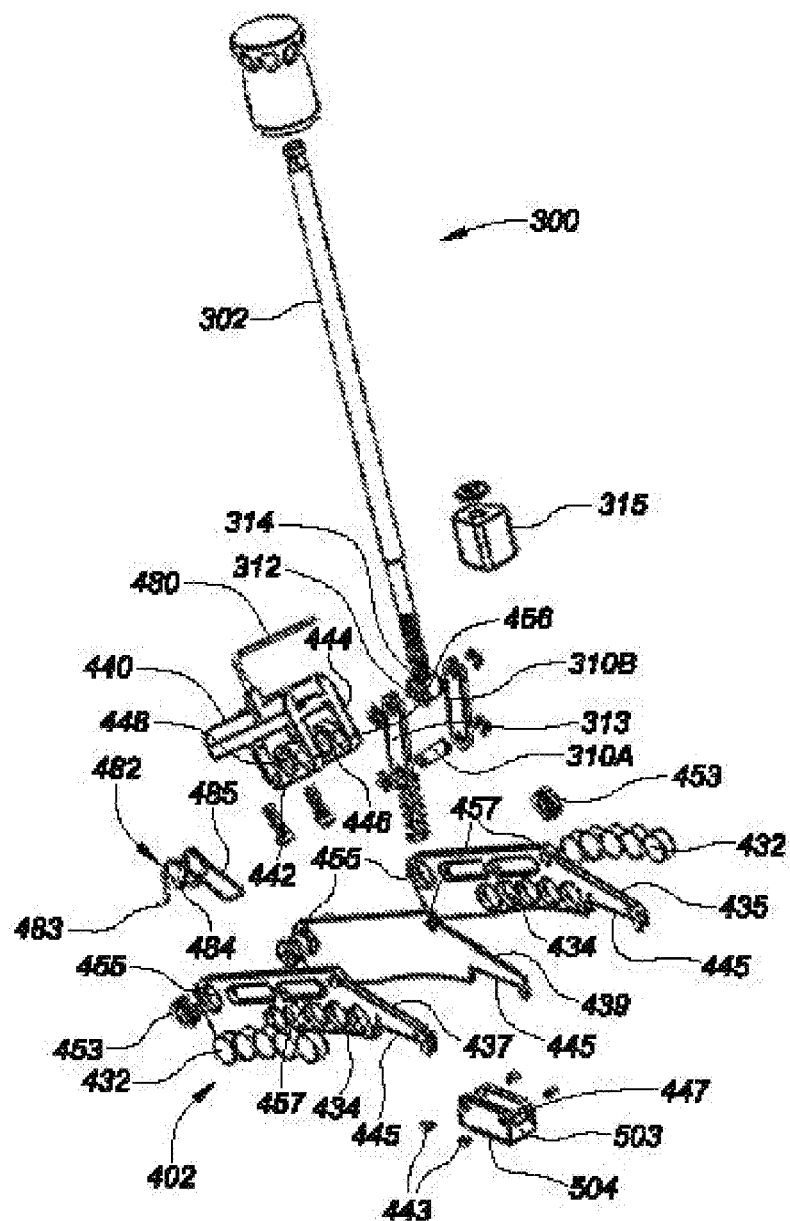
FIG. 27 shows an exploded view of a resistance assembly, a brake assembly and a resistance adjustment assembly.

A preferred embodiment is resistance assembly 400 as depicted in FIGS. 25-27. In general, resistance assembly 400 may include moveable arm 402 that may include one or more magnets 432 and that may be controllably moved through various positions relative to flywheel 30, and more particularly, controllably extended into and out of the interior space defined between upward disks 33, 35 and inner surface 37, to thereby increase or decrease the resistance applied thereto. Moveable arm 402 may be formed of a suitably strong and stiff material such as aluminum or any other suitable materials. This single arm embodiment preferably decreases the number of components and/or moving parts, and thus reduces cost and complexity.

One or more magnets 432 may be configured with moveable arm 402 within channels 434 having a size and shape configured for receiving at least a portion of each magnet 432 such that the outer surface of magnets 432 may be exposed while held within channels 434. Moveable arm 402 may include magnets 432 exposed on its left lateral surface 436 and on its right lateral surface 438 as depicted in the exploded view of FIG. 27 where two sets of magnets 432 are shown on either side of moveable arm 402. Alternatively, moveable arm may only include magnets 432 exposed on either of left or right lateral surfaces 436, 438. Magnets 432 may be positioned within channels 434 so that their exposed surfaces are flush with surfaces 436, 438, or so that they protrude therefrom. Magnets 434 may be secured within channels 434 by pressure, friction or other suitable connection methods such as welding, adhesives, friction fit connectors, clamps or other fastening methods.

As with prior embodiments, magnets 432 may be formed from rare earth elements or any other suitable magnetic material and may be circular or any other suitable shape. Circular magnets may be preferred in that they may result in a more spatially uniform positioning of the magnets 432 in proximity to flywheel 30. When using more than one magnet 432 on either the left or right lateral surface 436, 438, magnets 432 may be positioned on each lateral surface 436, 438 such that the magnetic pole nearest the flywheel 30 may alternate from North to South for each magnet 432 as shown in FIG. 25. The magnetic pole orientation of magnets 432 on opposite sides of arm 402 may be North to South so that magnets 432 are attracted to each other.

Magnets 432 may be generally aligned on a linear or curved line. For example, magnets 432 may be arcuately positioned to correspond the curvature of outer radial element 32. In this manner, each magnet 432 may be generally positioned at the same or similar distance from the outer radially element 32 of flywheel 30, which may provide for a more gradual and/or linear variation in resistance when adjusted by the rider.

The magnets 432 may be spaced relatively close to each other, which may allow more magnets 432 to be mounted on arm 402 to provide a sufficiently strong magnetic field to provide the desired range of resistances. The use of more magnets 432 may also create a larger increase and/or decrease in the resistance applied to the flywheel 30 as movable arm 402 is pivoted downward and/or upward.

In one embodiment, moveable arm 402 may be pivotally configured to frame 14 of cycle 12 by the use of pivot block 440. As depicted in FIG. 25 and FIG. 26, which shows brake arm 402 in relative up and down positions, respectively, arm 402 may be pivotally coupled to pivot block 440 that may be secured to frame 14 on the underside of down tube 24 posterior to forks 26. Pivot block 440 may be formed of any suitably strong material such as steel, aluminum or other materials, and may be secured to frame 14 with bolts, welding, or other suitable fastening methods. Block 440 is preferably positioned to avoid interfering with the rider, which position may also provide a sleek appearance.

Moveable arm 402 may have a first or rear end 404 at the rear arm 402 and proximate to pivot block 440, and a second or forward or front end 406. As with prior embodiments described above, rear end 404 may be coupled with pivot block 440 such that moveable arm 402 may generally extend forward from pivot block 440 toward the front of cycle 12. In this manner, when arm 402 is located in a generally downward position near flywheel 30, it may create force vectors tending to pull moveable arm 402 towards flywheel 30, requiring less force from the user to selectively increase the resistance and to use the brake and emergency brake. As with prior embodiments, despite these force vectors, the coupling between moveable arm 402 and adjustment shaft 302 of resistance adjustment assembly 300 may prevent moveable arm 402 from moving towards flywheel 30, avoiding any unintended increase in resistance.

As depicted in the exploded view of FIG. 27, pivot block 440 may generally comprise a downward U-shaped bracket, and include downward extending right and left sections 442, 444 that may form an inner space 446 therebetween. Inner space 446 may be configured to receive rear end 404 of moveable arm 402 and may preferably have a width that is slightly greater than the width of rear end 404 so that moveable arm 402 may fit and may move within inner space 446 without obstruction.

Downward extending right and left sections 442, 444 may include pivot pin openings 448, 450, respectively, which are configured to receive pivot pin 452. Pivot pin openings 448, 450 may be aligned along a central axis passing perpendicularly through the center of each opening 448, 450 such that pivot pin 452 may pass through openings 448, 450 and be secured thereto. Moveable arm 402 may have pivot pin opening 454 in its rear section 404 that is generally aligned with openings 448, 450, so that pivot pin 452 may pass through openings 448, 450, 454. In this configuration, pivot pin 452 may define a pivot axis or pivot point for moveable arm 402 with respect to pivot block 440 and cycle 12, and may be secured within openings 448, 450, 452 on each end of pivot pin 452 by spring clip washers, nuts, or other securing methods.

With rear section 404 of moveable arm 402 coupled with pivot pin 452, moveable arm 402 may rotate downward or upward about the pivot point so that forward end 406 and magnets 432 may be moved towards and away from outer radial element 32 of flywheel 30 to increase or decrease the magnetic resistance applied thereto.

Figure 35:
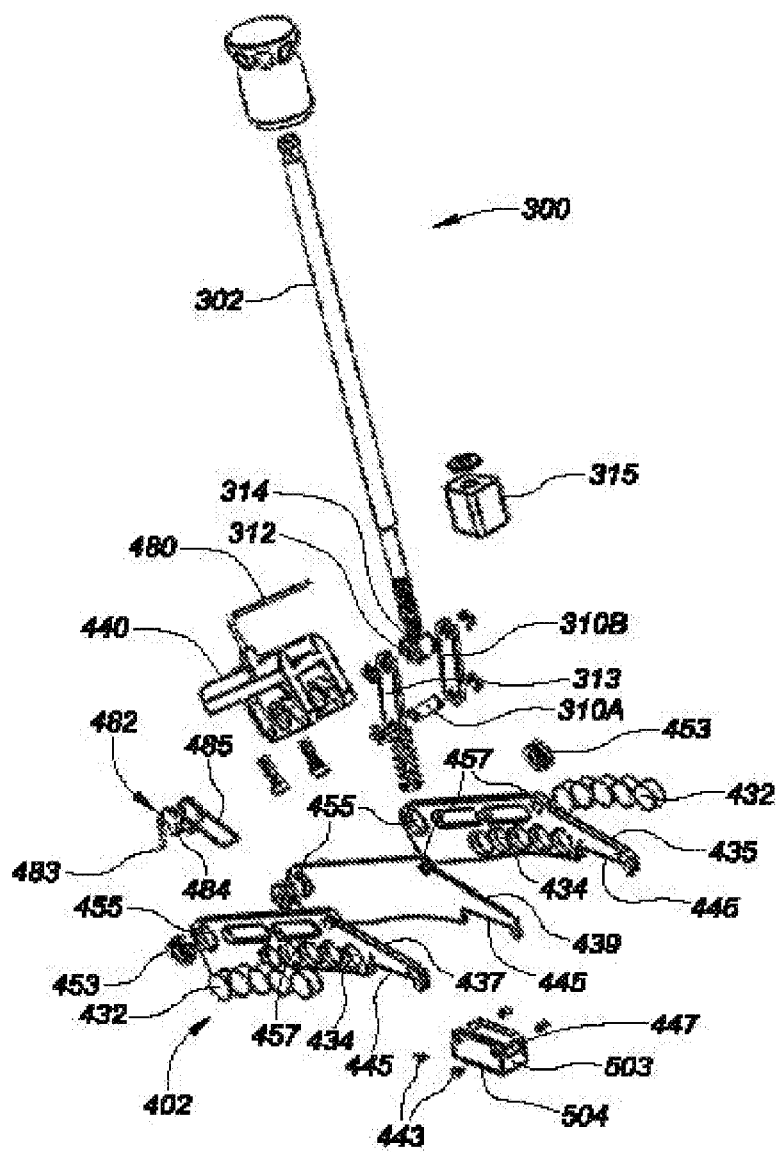
FIG. 35 is an exploded view of an adjustable resistance assembly.

Resistance assembly 400 may also include a biasing member (as shown in FIG. 35 as spring 485), such as a torsion spring, which may resist pivoting of moveable arm 402 that might otherwise occur due to force vectors as discussed above that may tend to attract arm 402 towards flywheel 30. In a preferred embodiment, the biasing member may be disposed around the pivot pin 452 and secured to pivot block 440.

The interaction between moveable arm 402 and flywheel 30 is now further described. As noted above, radial element 32 may include left and right upward extending circumferential lips or disks 33, 35 with inner circumferential surface 37 therebetween. As shown in FIGS. 25, 26, 28 and 29, moveable arm 402 may be configured with flywheel 30 on cycle 12 such that the length of moveable arm 402 may be generally perpendicular to the axis of rotation of flywheel 30 and therefore generally aligned with circumferential inner space 37 of outer radial element 32. In this configuration, forward section 406 may pivot about pivot pin 452, for example, by adjustment of resistance adjustment assembly 300, such that moveable arm 402 and magnets 432 attached thereto may adjustably extend into and out of the interior space defined by disks 33, 35 and inner surface 37. Left and right upward disks 33, 35 are preferably spaced to accommodate the width of moveable arm 402 including magnets 432, so that moveable arm 402 and magnets 432 may pass into this without physically contacting disks 33, 35.

Figure 28:
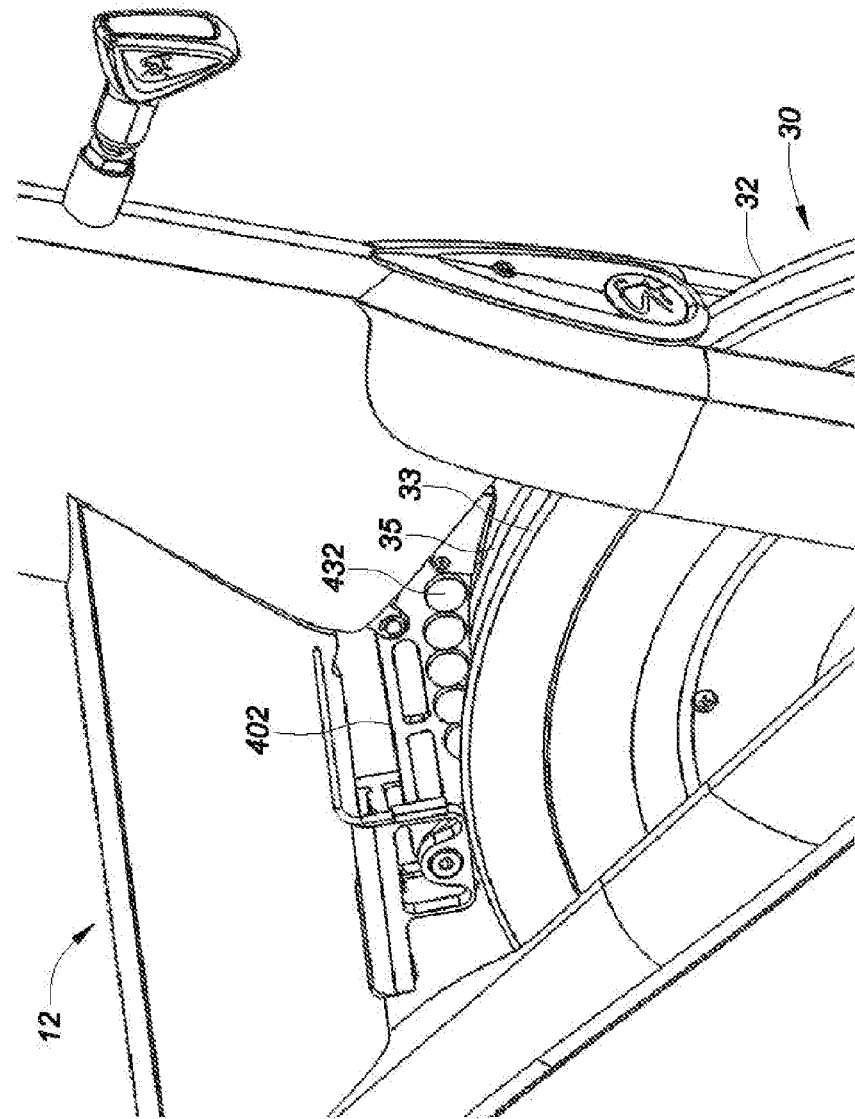
FIG. 28 shows a perspective view of a resistance system with a moveable arm in a generally upward position in accordance with an additional embodiment of the current invention.

FIGS. 25 and 28 depict moveable arm 402 in a generally upward position with forward section 406 positioned generally away from outer radial element 32. In this position, the rearmost magnets 432 may be positioned within the space between left and right upward disks 33, 35 to still provide some amount of magnetic resistance. However, when arm 402 is in this upward position, magnets 432 may apply a minimum amount of resistance to the rotation of flywheel 30 because magnets 432 may be positioned away from outer radial element 32. As an alternative, rear or first section 404 of moveable arm 402 and the rearmost magnets 432 may be positioned above the space between left and right upward disks 33, 35.

From this upward position, moveable arm 402 may be rotated downward towards outer radial element 32, so that magnets 432 may sequentially, starting from the rear, pivot into the area between left and right upward disks 33, 35 thereby increasing the magnetic resistance. To this end, the moving flywheel 30 may experience a drag force from magnets 432 that opposes its motion, proportional to its velocity and proportional to how close magnets 432 may be to its conductive outer radial element 32.

Figure 29:
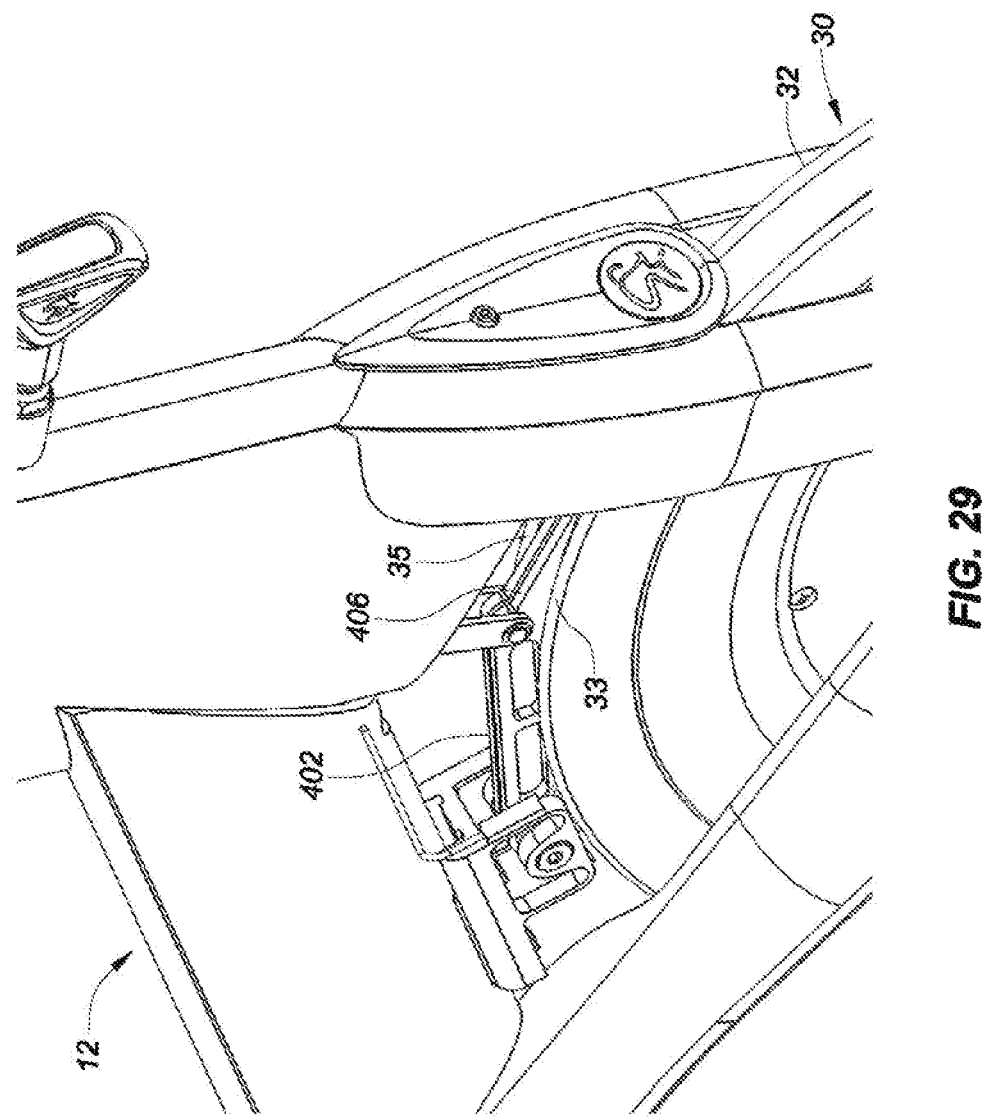
FIG. 29 shows a perspective view of a resistance system with a moveable arm in a generally downward position in accordance with an additional embodiment of the current invention.

Therefore, as each magnet 432 enters into space between left and right upward disks 33, 35 and comes into closer proximity with conductive upward disks 33, 35, the magnetic resistance applied to flywheel 30 may be progressively increased. Once all or the majority of magnets 432 are rotated into the space between disks 33, 35 as depicted in FIGS. 26 and 29, an increased or maximum amount of magnetic resistance may be applied to the rotation of flywheel 30. It should be noted that moveable arm 402 may be placed in any position between fully upward and fully downward so that any amount of magnetic resistance between a minimum amount and a maximum amount may be applied to flywheel 30. To this end, it is preferred that the amount of magnetic resistance may be finely tuned or adjusted by the rider to accommodate different riding positions, e.g., sitting and standing positions.

Pivot block 440 is now further described. Downward extending left and right sections 442, 444 may include left and right forward guide members 454, 456 as shown in FIGS. 25, 27. In this manner, left and right forward guide members 454, 456 may extend forward along the left and right lateral surfaces 436, 438 of moveable arm 402 to provide lateral support to moveable arm 402 as it pivots about the axis point defined by pivot pin 452.

As noted above, flywheel 30 and resistance assembly 400 may be used with a resistance adjustment assembly such as resistance adjustment assembly 300 described above in relation to resistance assembly 100. In this current embodiment, assembly 300 may serve to adjust the resistance applied to the rotation of flywheel 30 by lowering and/or raising movable arm 402 such that the depth of magnets 432 within the space between left upward disk 33 and right upward disk 35 of outer radial element 32 of flywheel 30 may be increased and/or decreased respectively. This adjustable positioning of magnets 432 relative to disks 33, 35 may vary the strength of magnetic field that flywheel 30 passes through, and as a result, may vary the amount of magnetic resistance applied to flywheel 30 as it rotates.

Referring to FIG. 27, resistance adjustment assembly 300 may include adjustment knob or handle 308, adjustment rod 302, guide block 315, link arms 310A, 310B, link arm spacer 312 with link arm hole 314, and other elements. The assembly of these elements with respect to each other and to cycle 12, and the functionality and use therewith, has been described in detail in earlier sections of this specification and will therefore not be repeated here.

In this embodiment, resistance adjustment assembly 300 may be configured with moveable arm 402 through the use of link pivot pin 460. Link arms 310A, 310B may include link pin openings 462, 464 with each opening 462, 464 configured to receive link pivot pin 460. Moveable arm 402 may also include link pivot hole 458 that may be generally located towards the front section 406 of moveable arm 402 as depicted in FIGS. 25-27. With front section 406 of moveable arm 402 configured between link arms 310A, 310B, link pin openings 462, 464 and link pin pivot hole 548 may be aligned along a central axis passing perpendicularly through the center of each opening 462, 464, 548 such that link pivot pin 460 may pass through openings 462, 464, 548 and be secured thereto. In this configuration each end of link pivot pin 460 may be secured within openings 462, 464, 548 by spring clip washers, nuts, or other securing methods.

With moveable arm 402 coupled to resistance adjustment assembly 300 as described above, rotating knob 308 in one direction may lower moveable arm 402 and magnets 432 deeper within the space between left and right upward disks 33, 35 thereby increasing the magnetic resistance applied to rotating flywheel 30. Conversely, rotating knob 308 in the other direction may raise moveable arm 402 so that there is less overlap of magnets 432 within the space between left and right upward disks 33, 35, thereby decreasing the magnetic resistance applied to rotating flywheel 30.

Resistance system 10 may also include brake assembly 500. As with brake assembly 200 described above in relation to resistance assembly 100 and flywheel 16, brake assembly 500 may be coupled with resistance assembly 300 to form a brake or emergency brake to quickly slow or stop flywheel 30 from rotating through friction.

Referring now to FIGS. 25 and 27, in a preferred embodiment, brake assembly 500 may include brake pad holder 502 and brake pad 504. Brake pad holder 502 may be mounted to the underside of the front section 406 of moveable arm 402 using bolts, screws, adhesive or other suitable attachment methods. Moveable arm may also include lower cutout 506 with a length and depth that may receive brake pad holder 502 and allow it to be suitably secured within cutout 506 to remain secure and withstand forces associated with braking. Brake pad holder 502 may be secured within cutout 506 using bolts, screws, adhesive or other suitable attachment methods.

Brake assembly 500 may also include brake pad 504 that may be secured to the underside of brake pad holder 502 such that brake pad 504 may extend downward from brake pad holder 502. Brake pad 504 may be secured to brake pad holder 502 using bolts, screws, adhesive or other suitable attachment methods. In this manner, when brake pad 504 is worn and needs replacement, it may be removed from brake pad holder 502 and replaced with a new pad 504.

It is preferred that brake pad 504 be aligned with flywheel 30 such that as moveable arm 402 is lowered, brake pad 504 also pivots into the space between disks 33, 35, and that as moveable arm 402 is lowered more, brake pad 504 may physically engage inner surface 37 of outer radial element 32. This physical engagement may apply sufficient friction to slow or stop flywheel 30 from rotating.

Resistance adjustment assembly 300 is also preferably configured so that knob 308 may be pushed downward to cause moveable arm 402 to pivot downward such that brake pad 504 may quickly engage surface 37 to provide physical braking to flywheel 30. In this manner, brake assembly 500 may advantageously be used as an emergency brake to quickly slow or stop the rotation of flywheel 30. Conversely, knob 308 may be generally pulled upward to retract moveable arm 402 and brake pad 504 from radial element 32 of flywheel 30 in order to lessen or remove the physical engagement between pad 504 and flywheel 30.

In a preferred embodiment, the user may press down on knob 308 which causes adjustment rod 302 to move downward relatively quickly or abruptly. The downward movement of adjustment rod 302 may then exert a downward force on movable arm 402 via the link arm spacer 312 and link arms 310A, 31B thereby causing movable arm 402 to pivot downward quickly or abruptly (i.e., not gradually or incrementally) so that brake pad 504 frictionally engages a portion of flywheel 30 (for example, inner surface 37) and quickly causes its rotation to slow down or stop.

To use the brake assembly 500, it is preferred that the user must press down on the knob 308 with enough force overcome the resistance from bias member that resists rotation of the movable arm 402. Likewise, once the user releases the knob 308, the bias member may cause the movable arm 402 to pivot upward so that brake pad 504 is no longer in contact with the flywheel 30.

As illustrated in FIGS. 26 and 28, as brake pad 504 engages flywheel 30, magnets 432 may be positioned in close proximity to left and right upward disks 33, 35. Thus, in addition to the frictional force applied by brake assembly 500 to flywheel 30, the eddy current created by resistance assembly 400 may also help slow or stop flywheel 30. Because of this additional eddy current resistance, the rider may need to apply less downward force on knob 308 to slow down or stop flywheel 30 within a given amount of time or from a given speed of rotation, than would be required using a friction brake alone.

Brake assembly 500 provides an advantage over conventional frictional resistance systems because pad 504 does not continuously engage flywheel 30 when providing variable resistance. Instead, pad 504 need only physically engage flywheel 30 when the user wants to slow or stop flywheel 30 more abruptly, e.g., as an emergency brake. Accordingly, the wear of pad 504 is reduced, and any wear does not affect the integrity of the resistance adjustment provided by resistance assembly 400.

Another aspect of the current embodiment for measuring the rider's energy exerted is now further described with reference to FIGS. 25-27. As flywheel 30 rotates with moveable arm 402 and magnets 432 positioned in proximity thereto, the magnetic force may tend to pull moveable arm 402 forward. This may in turn apply a forward pulling force to pivot block 440 through pivot pin 452. As the user pedals more vigorously causing flywheel 30 to rotate faster, the magnetic force increases thereby increasing the pulling force on arm 402 and pivot block 440. This pulling force may cause downward extending right and left sections 442, 444 of pivot block 440 to flex forward, with the amount of forward flex being proportional to the amount of magnetic force created by rotating flywheel 30. The amount of energy exerted by the user in causing flywheel 30 to rotate may thus be measured.

To measure the flex of downward extending sections 442, 444, load cell or strain gauge 480 may be positioned between cycle frame 24 and either the left or right downward extending sections 444, 442, as shown in FIGS. 25 and 26. In this manner, as downward extending sections 444, 442 flex forward due to the magnetic field, load cell 480 may measure the amount of flex and may relay this measurement to a computer or other device. Load cell 480 may be calibrated and used with software in such a way that its measurements may correlate the amount of forward flex of downward extending sections 444, 442 to the amount of energy (e.g. watts) exerted by the user. In this way, the user may have a real time power measurement while riding cycle 12.

Figure 30:
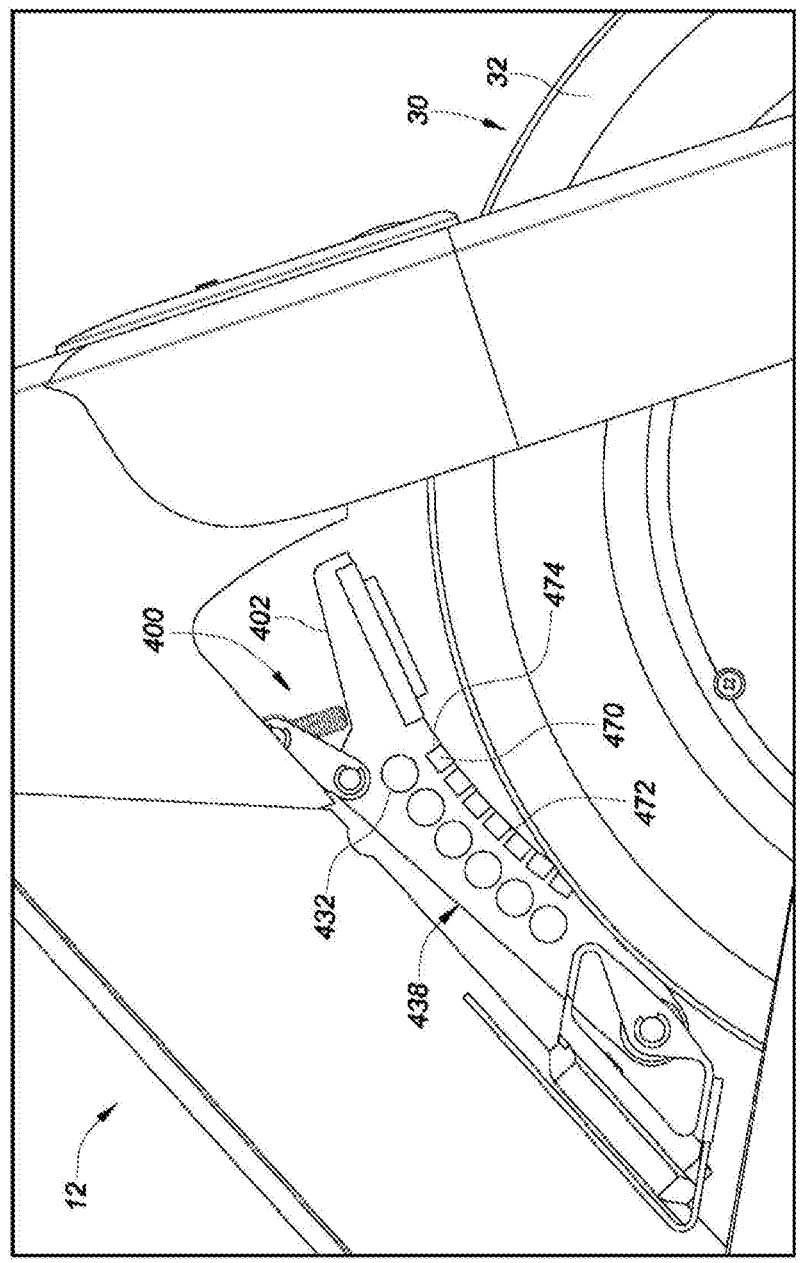
FIG. 30 shows a side view of a resistance system with a moveable arm in a generally upward position in accordance with an additional embodiment of the current invention.

Another embodiment of resistance system 400 involving an alternative magnet array is now described with referenced to FIG. 30. As shown, moveable arm 402 may include lower magnets 470, that may have a generally rectangular or square shaped cross-section and that may be generally positioned on the lower surface 472 of moveable arm 402, e.g., below magnets 432. While lower magnets 470 are shown as having a generally rectangular or square shaped cross-section, other shaped cross-sections may also be used.

The lower surface 472 of moveable arm 402 may include slots 474 that are sized and dimensioned to receive and secure at least a portion of each lower magnet 470 such that lower magnets 470 may be positioned so that their bottom surfaces are flush with lower surface 472 or protrude therefrom. Slots 474 may pass from the left side 436 to the right side 438 of moveable arm 402 such that the left and rights sides of lower magnets 470 may be exposed. Slots 474 may also include an open lower channel so that the bottom surfaces of lower magnets 470 may be exposed.

As an alternative, slots 474 may only extend for part of the thickness of arm 402 between left and right sides 436, 438, but may be exposed to the bottom of arm 402. In this manner, the sides of magnets 470 are not exposed, but the bottom surfaces may be.

Lower magnets 470 may be secured within channels 434 by pressure, friction or other suitable connection methods such as welding, adhesives, friction fit connectors, clamps or other fastening methods. In addition, moveable arm 402 may have a sheath (not shown) attached to its bottom surface that may pass over the bottom surface of lower magnets 470 thereby securing lower magnets 470 in place within slots 474 and protecting lower magnets 470 from debris. It is preferred that any such sheath comprise a nonconductive material such as plastic or other similar material that does not dampen or otherwise interfere with the pertinent magnetic fields.

In this configuration, as moveable arm 402 is pivoted downward and upward by adjustment assembly 300, lower magnets 470 may lower or raise in and out of the area between upward disks 33, 35. As lower magnets 470 descend into this area, they approach inner surface 37, and as described above, inner surface 37 may comprise a conductive material so that the magnetic fields associated with lower magnets 470 may induce eddy currents in inner surface 37 that may oppose the magnetic field of lower magnets 470 thereby creating a drag force on the rotation of flywheel 30. This drag force may create resistance to the forward rotation of flywheel 30 and be proportional to the velocity of flywheel 30 and proportional to how close lower magnets 470 are to conductive inner surface 37. This is similar to the drag force imposed on rotating flywheel 30 in association with magnets 432 interacting with conductive left and right upward disks 33, 35 as described above. The magnetic pole orientation of lower magnets 432 may alternate between North and South.

Lower magnets 470 may be generally aligned on a linear or curved line. For example, lower magnets 470 may be aligned in a curve that corresponds to the curvature of outer radial element 32 so that each lower magnet 470 may be positioned at the same or similar distance from the outer radially element 32 of flywheel 30.

Lower magnets 470 may also be spaced relatively close to each other to increase the number of lower magnets 470 mounted on arm 402 to provide a sufficiently strong magnetic field to provide the desired range of resistances. Increasing the number of lower magnets 470 may also create a larger increase and/or decrease in the resistance applied to the flywheel 30 as movable arm 402 is pivoted down or up. While FIG. 30 depicts the use of seven lower magnets 470, other numbers may be used.

Magnets 432 may be positioned on left and right sides 436, 438 of movable arm 402 above lower magnets 470 as shown in FIG. 30. In this manner, both magnets 432 and lower magnets 470 may contribute to the resistance provided as arm 402 is lowered or raised.

From the upward position depicted in FIG. 30, as forward section 406 of movable arm 402 is pivoted downward, lower magnets 470 may sequentially, starting from the rear, pivot into the area between left and right disks 33, 35 in proximity to surface 37 to increase resistance. Once the majority of lower magnets 470 are pivoted into the space between left and right disks 33, 35 and closer to inner surface 37, magnets 432 may then start pivoting into the area between disks 33, 35 to provide additional magnetic resistance.

In an alternative embodiment, magnets 432 need not be utilized in addition to lower magnets 470, and resistance assembly 400 may rely solely on lower magnets 470 to generate the magnetic resistance used to apply resistance to the forward rotation of flywheel 30.

As a further alternative, magnets 432 may be positioned on only the left side 436 or the right side 438 of moveable arm 402, such that magnets 432 may magnetically interact with left upward disk or right upward disk 35, respectively. In this scenario, resistance assembly 400 may rely on lower magnets 470 and magnets 432 on either left side 436 or magnets 432 on right side 438 to generate the magnetic resistance used to apply resistance to the forward rotation of flywheel 30.

Figure 33:
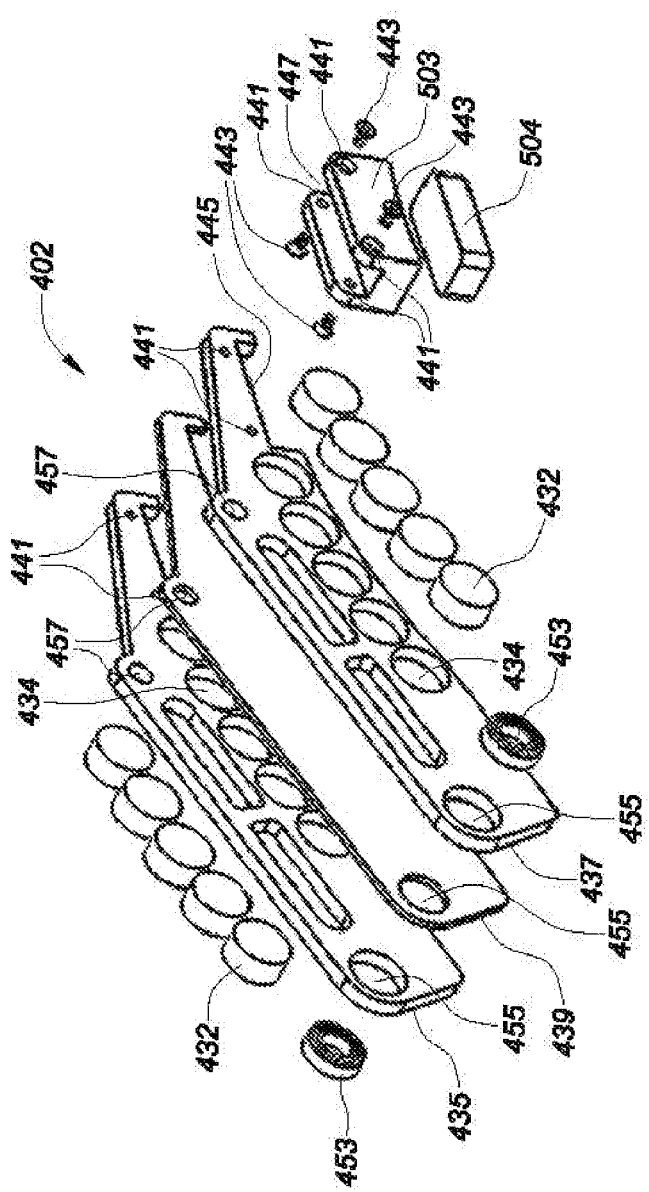
FIG. 33 is an exploded view of a brake arm.
Figure 34:
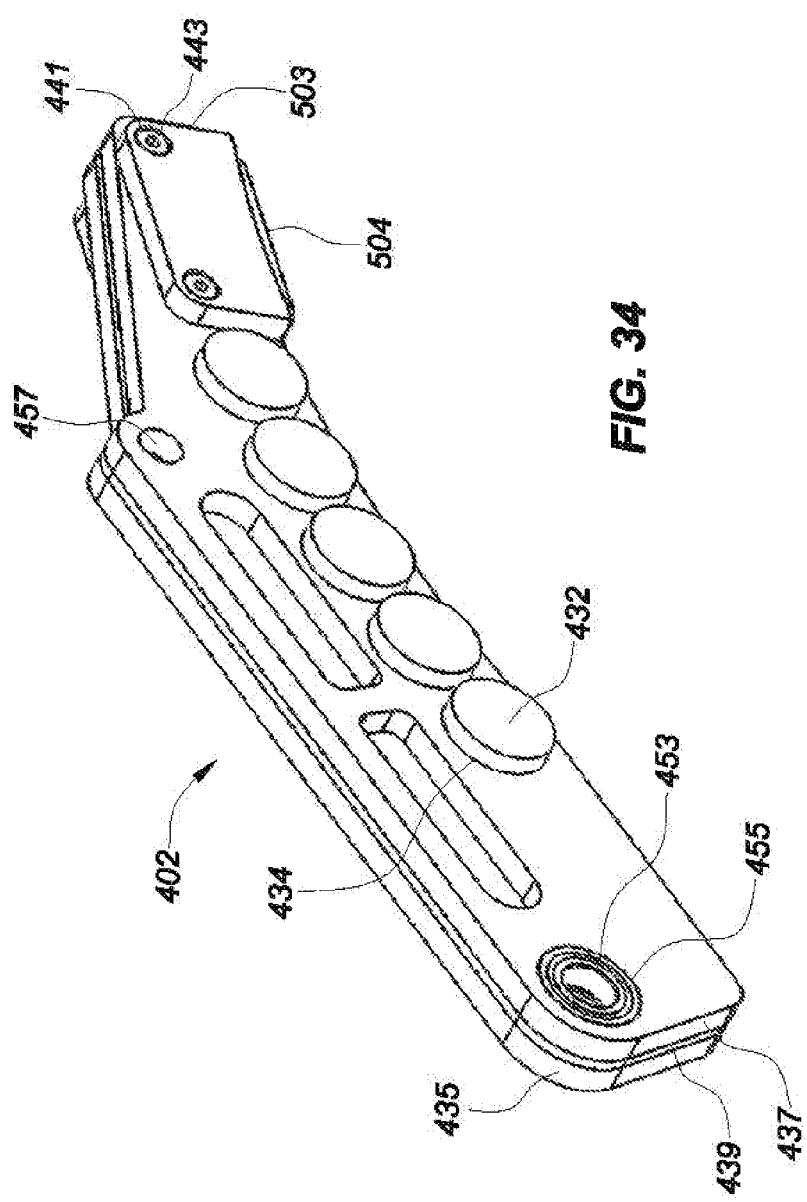
FIG. 34 is a perspective view of a brake arm.

Other embodiments involving a single brake arm are now described with reference to FIGS. 33-35 and FIGS. 36-37. One such embodiment includes a multi-layered single brake arm as shown in FIGS. 33-35. In this embodiment, moveable arm 402 may comprise left side plate 435, right side plate 437 and center or divider plate 439 to form single moveable arm 402. Plates 435, 437 may include holes or cutouts 432 to hold magnets 432. Center plate 439 may comprise a stamped sheet and need not have corresponding holes.

Plates 435, 437, 439 may be formed of a rigid and strong material such as metal or other sufficiently strong materials. It is preferred that the side plates 435, 437 comprise aluminum to save on weight and for ease of manufacture when cutouts 434 are formed, and that center plate 439 comprise steel for purposes of having a ferrous material to assist with precise positioning of magnets 432 due to the attractive forces between magnets 432 and steel plate 439.

The above-described configuration of brake arm 402 advantageously allows the level of magnetic flux provided between resistance system 402 and flywheel 30 to be tuned by increasing or decreasing the thickness of center plate 439. (This flux adjustment is separate and apart from the resistance adjustment that occurs when brake arm 402 is moved up and down in relation to flywheel 30 and in between disks or loops 33, 35). More specifically, as the thickness of center plate 439 increases, magnets 432 may be positioned closer to loops 33, 35, and as the gap between magnets 432 and loops 33, 35 decreases, the flux (and thus the resistance) increases.

In general, it is preferred that the configuration of flywheel 30 remain constant because changing the location or thickness of disks 33, 35 would involve increased manufacturing and material cost. This is especially so where flywheel 30 would be used on various models of indoor cycles in a company's range of cycles. It is also preferred that magnets need not be changed to vary the distance between them and loops 33, 35. Because this would lead to increased inventory costs of a relatively expensive component. By comparison, center plates 439 with different thicknesses may be easily replaced, and carrying an inventory of steel plates represents an efficient and less expensive way to adjust flux.

Plates 435, 437, 439 may be formed to have similar shapes and/or perimeters so that they may be joined to form single brake arm 402. To this end, aluminum plates 435, 437 may be extruded while steel center plate 439 may be stamped. Other manufacturing options may be used to form plates 435, 537, 439. In any event, when plates 435, 437, 439 are joined to form single brake arm 402, as shown in FIG. 34. As noted above, the single-arm configuration of this embodiment may ease manufacturing, decrease complexity and increase durability.

The components of moveable arm 402 are now further described. Plates 435, 437, 439 may each include a cutout near their front ends so that when the plates 435, 437, 439 are joined, a single cutout 445 may be formed to accommodate friction brake holder or housing 503 and brake pad 504. Brake pad holder 503 may include slot 447 to receive brake arm 402.

Brake pad holder 503 and plates 435, 437 may also include holes 441 that align when brake arm 402 and housing 503 are joined to receive screws or other fastening means. Divider plate 439 need not include holes which may save on manufacturing costs. Brake pad 504 may be secured to the underside of brake pad holder 503 with bolts, screws, adhesive or other suitable fasteners. In this manner, single brake arm 402, brake pad holder 503 and brake pad 504 are securely held together to withstand the forces that may occur when friction pad is pushed down against flywheel 30.

When brake pad 504 is worn and/or otherwise needs to be replaced, brake pad holder 503 may simply be removed from brake arm 402 and replaced with a new brake unit. This avoids complicated replacement operations that may be required with other magnetic brakes that include a friction brake.

Plates 435, 437 may also include bores, holes, channels or other suitable cutouts 434 to receive magnets 432. Holes 434 may extend entirely through each side of plates 435, 437 as shown in FIG. 33, or partially through. Channels 434 and magnets 432 have been described above in relation to prior embodiments of moveable arm 402 and may be formed and configured in this embodiment similarly. Accordingly, these details are not repeated here.

Plates 435, 437, 439 may also each include pivot pin opening 455 towards their rear ends so that when they are joined to form single brake arm 402, pivot pin openings 455 are aligned to form a single pivot pin opening 455. With moveable single brake arm 402 having rear pivot pin opening 455, arm 402 may be configured with pivot block 440 as described in prior embodiments, and those details will not be repeated.

However, moveable arm 402 may include ball bearing rings 453 that may be configured within pivot pin opening 455 as shown in FIGS. 33, 34 and 35. Plates 435, 437 may each include a ball bearing ring 453 in their individual pivot pin openings 455, respectively, or a single ball bearing ring 455 may extend through the combined pivot pin opening 455 of the single brake arm 402. Other numbers of ball bearing rings 453 may also be used. Ball bearing rings 453 may also include center openings that may receive pivot pin 452.

With ball bearing rings 453 configured within pivot pin opening 455 and with pivot pin 452 configured within the center openings of ball bearing rings 453, moveable arm 402 may engage pivot block 440 and pivot in relation thereto. That is, ball bearing rings 453 allow moveable arm 402 to rotate along the axis of pivot pin 452 freely and with minimized friction.

Plates 435, 437, 439 may also include holes 457 that are aligned to form hole 457 in single brake arm 402. Hole 457 may engage resistance adjustment mechanism 300 to raise and lower single brake arm 402 in relation to flywheel 30 and between loops or disks 33, 35 as described above. The engagement between arm 402 and mechanism 300 is also further described below in connection with FIGS. 38-41.

As shown in FIG. 35, brake arm 402 may also include spring 482 that may be positioned around pivot pin 452 and/or otherwise engage may engage pivot block 440 to exert an upward force on single brake arm 402. Spring 482 may have a first end 483 that abuts block 440 or other part of the indoor cycle against which spring 482 may push. Spring 482 may also include one or more coiled section(s) 484 that provide(s) an upward force through a torsional spring rate. Spring 482 may also include a second end that may engage single brake arm 402. As shown in FIG. 35, second end may be configured as a u-shaped bracket that may engage the underside of brake arm 402 to exert an upward force thereon.

Spring 482 preferably has a spring rate sufficient to counteract downward forces that would tend to otherwise lower brake arm 402 towards flywheel 30. These downward forces may include the gravitational force of the weight of single brake arm assembly 402, as well as the downward force vectors that exist with the eddy currents and magnetic flux associated with the current invention. However, it is also preferred that the spring rate be low enough so that the user may still lower brake arm 402 towards flywheel 30, such as when the user wants to push down on knob 308 to engage the emergency friction brake 504.

Spring 482 need not be configured as shown in FIG. 35, and one skilled in the art will appreciate that other spring configurations may be used to accomplish the function described above. Furthermore, spring 482 may also be included in the embodiments described above.

The embodiment of single brake arm 402 shown in FIGS. 33-35 may also include device 480 to measure power and the user's effort as described above. The details regarding this component are not repeated here, as one skilled in the art will recognize how the earlier description applies to this single arm embodiment. It should be noted, however, where brake arm 402 does not include device 480, pivot block 440 may comprise a simpler design, i.e., a design where the sides of block 440 are not cut out to form the ribs that are used to measure the flex of block 440, which results from the magnitude of magnetic force, which in turn results from the intensity at which the rider pedals and rotates flywheel 30 in relation to the magnets 432 on brake arm 402.

It should also be noted that where power measurement device 480 is used, however, that ribs or hanger elements 444 may be tuned to accommodate the power measurement device 480 used. That is, the thickness or other dimension of elements 444 may be increased or decreased so that the amount of flex experienced thereby may be adequately measured by device 480 and processed by associated software so that the power measurements are useful.

In the above-described embodiment, the manner in which magnets 432 interact with disks 33, 35 of flywheel 30 may be similar to that described in connection with other embodiments described above and as shown in FIGS. 25-26. That is, when arm is in the lowered position, as shown in FIG. 26, most or all of magnets 32 are within disks 33, 35, and thus overlap flywheel 30. And when arm 402 is raised, at least some of the magnets 32 may still be located between disks 33, 35 so that there is still some overlap between magnets 432 and flywheel 30.

Another embodiment of single brake arm 402 is now described with reference to FIGS. 36-37. At the outset, it should be noted that this additional single brake arm 402 embodiment may pivot in relation to pivot block 440 and the indoor cycle as described above. This single arm brake 402 may also be raised and lowered by resistance adjustment mechanism 300 as described above.

Figure 36:
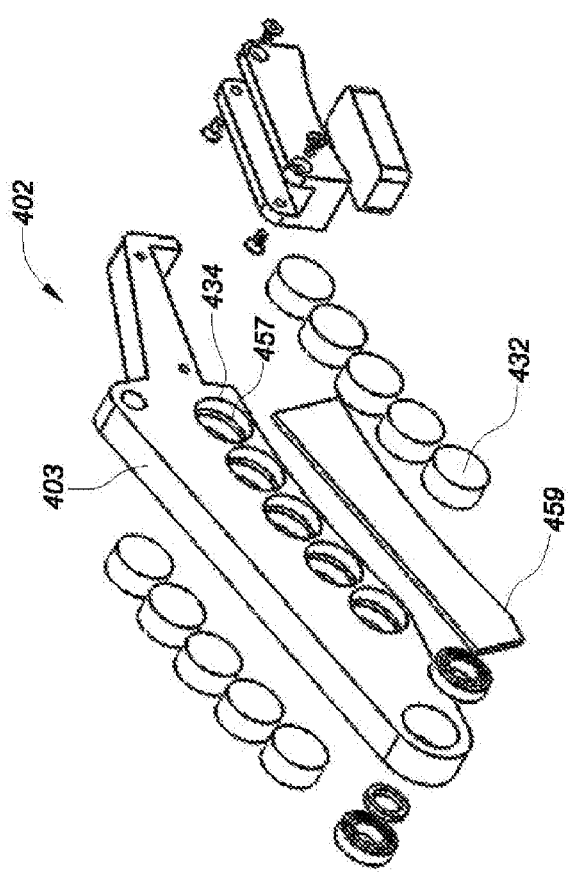
FIG. 36 is an exploded view of a brake arm.
Figure 37:
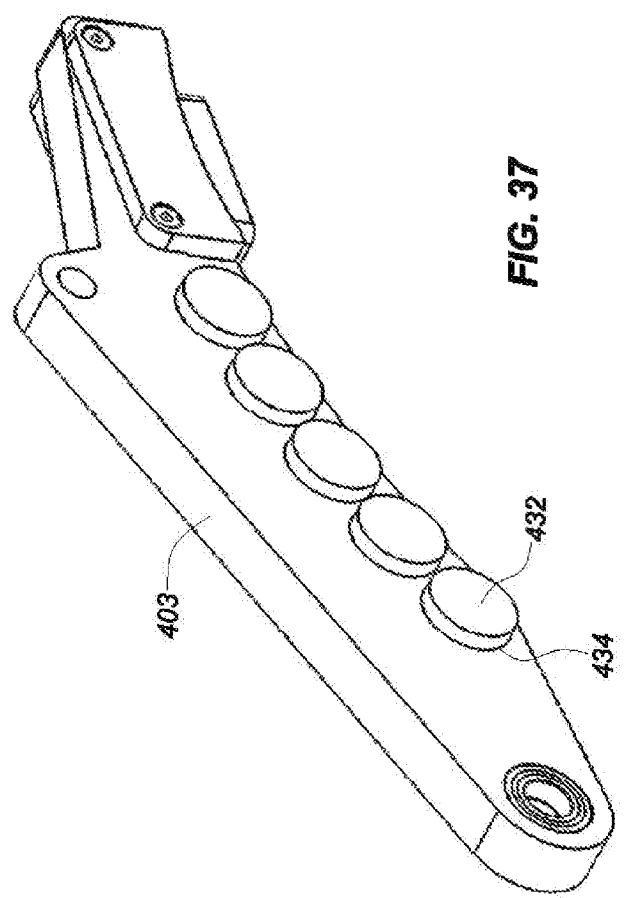
FIG. 37 is a perspective view of a brake arm.

In the embodiment of FIGS. 36-37, moveable arm 402 may comprise body or arm 403. Arm 403 may comprise aluminum or other suitable material as described above in connection with FIGS. 33-35. Body or arm 403 may include slot 457 that may extend from the bottom surface of body 403 upward and into body 403. Slot 457 may be configured with a shape and size to receive plate 459. Plate 459 preferably comprises steel for purposes of having a ferrous material to provide an eddy current for magnetic resistance.

Slot 457 and plate 459 may be dimensioned so that plate 459 snuggly fits within slot 457, and so that the bottom of plate 459 is flush with the bottom of arm 403. Other dimensions may be used.

Arm 403 may include channels, holes, bores or cutouts 434 to receive magnets 432. Channels 434 may pass entirely through body 403 as shown in FIG. 36 or may pass only partially through. Channels 434 may receive magnets 432 as described above with other single brake arm 402 embodiments, and the associated details are not repeated here.

Slot 457 may extend from the bottom side of body 403 upward beyond channels 432 such that plate 459 may also extend upward within body 403 past channels 434 and magnets 432. Plate 459 may be secured within slot 457 with pressure, friction, screws, adhesive, welding or other suitable securing means. It should be noted that slot 457 may be located and extend inward from other surfaces of body 403, such as from the top, rear or front of body 403.

Brake pad holder 503 and brake pad 504 may be configured with moveable arm 402 as described the prior embodiment. In addition, moveable arm 402 may be configured with pivot block 440 as described in previous sections. The resistance or flux created between arm 403 and flywheel 30 may be adjusted as described in the preceding embodiment by increasing the width of slot 457 and plate 459 so that magnets are positioned closer to disks 33, 35 of flywheel 30. Furthermore, an overlap between magnets 432 and disks 33, 35 of flywheel 30 may exist when single brake arm 402 is in a lowered or raised position. Power measurement device 480 may also be used with the embodiment of FIGS. 36-37, and pivot block 440 may include cutouts or not, depending on whether device 480 is included, as described above.

Additional embodiments of resistance adjustment assemblies 300, and the manner in which they may raise or lower brake arm 402 are now described with reference to FIGS. 35 and 38-39 and FIGS. 40-41.

As noted earlier, FIG. 35 is an exploded view of resistance adjustment assembly 300 and brake arm assembly 402. Many of the components therein are similar to those in FIGS. 9A-9B, and FIG. 27. One difference, however, is that link arms 310A, 310B may be curved as opposed to linear.

Figure 38:
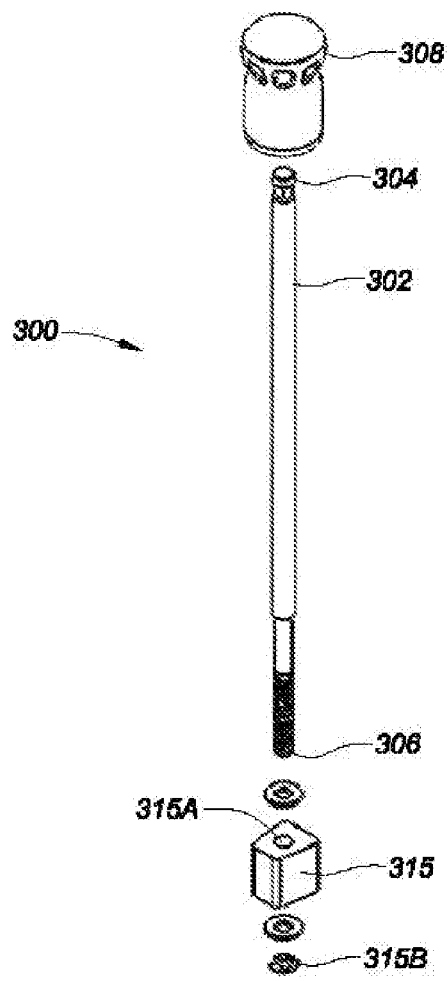
FIG. 38 is an exploded view of a resistance adjustment mechanism.
Figure 39:
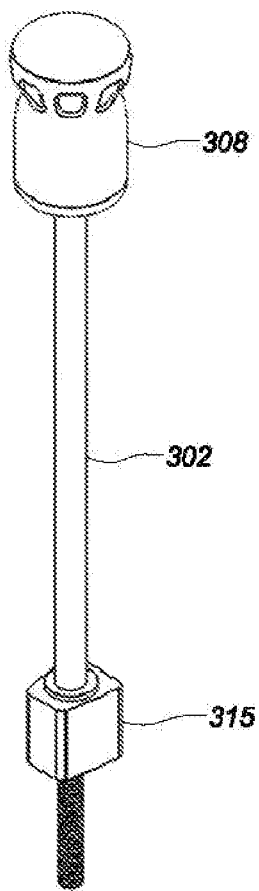
FIG. 39 is a perspective view of a resistance adjustment mechanism.

FIGS. 38-39 show a portion of a first additional embodiment of adjustment assembly 300 in exploded and assembled views, respectively. As shown in FIG. 38, adjustment rod 302 may again have proximal end 304 that engages knob 308, and distal end 306 that is threaded. Rod 302 and its distal end 306 may pass through guide block or upper follower 315. In this this embodiment, upper follower 315 may be include bore 315A which is drilled to have a diameter larger than that of rod 302. In this embodiment, bore 315A is not threaded so that rod 302 may rotate therein when the user rotates knob 308. Guide block 315 may be generally captured in a fixed axial position relative to rod 302 by clip 315B.

Rod 302 may then extend downward to lower follower nut 312 (or link arm spacer as referenced in earlier embodiments) as shown in FIG. 35. Nut 312 may include bore 314 that is threaded to engage the threaded portion of distal end 306 of rod 302. As such, follower nut 312 may ride on the threaded portion of distal end 306 so that rotation of rod 302 will cause nut 312 to move axially up or down, depending on the direction of the user's rotation of knob 308. Because nut or link arm 312 is coupled to link arms 310A, 310B, rotation of knob 308 will result in single brake arm 402 being raised or lowered.

In this embodiment, the threads of follower nut 312 may be left-hand so that a clockwise rotation of the knob 308 would cause brake arm 402 to move down and increase resistance. This left-hand threading is preferred to make knob 308 loosen/tighten protocol consistent with existing indoor cycles having friction brakes.

It is also preferred that this left-hand threading configuration be of a "fast-helix" design, such as a buttress (acme) thread, that may axially move lower follower nut 312 up and down more rapidly that with a traditional thread pitch. With this thread configuration, the user need not rotate knob 308 multiple times while riding the indoor cycle. This increases safety and allows the rider to focus on riding.

In the more common friction brake designs existing on current indoor cycles, the friction pad position, which is driven by rotation of the tension knob, requires little motion to move between positions of no resistance and full resistance. As such the rider need only rotate the knob a limited number of turns. In contrast, existing magnetic brakes typically require that the magnetic brake arm travel a much larger distance to between no resistance and full resistance positions, which requires more turns of the tension knob. As such, the current invention's use of a fast-helix thread form allows brake arm 402 to be raised or lowered more quickly, which is consistent with current friction brake designs with which riders are familiar.

Figure 40:
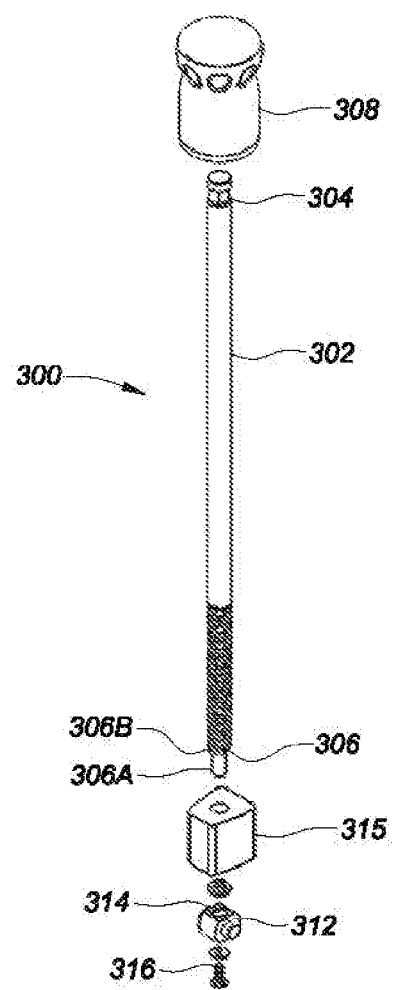
FIG. 40 is an exploded view of a resistance adjustment mechanism.
Figure 41:
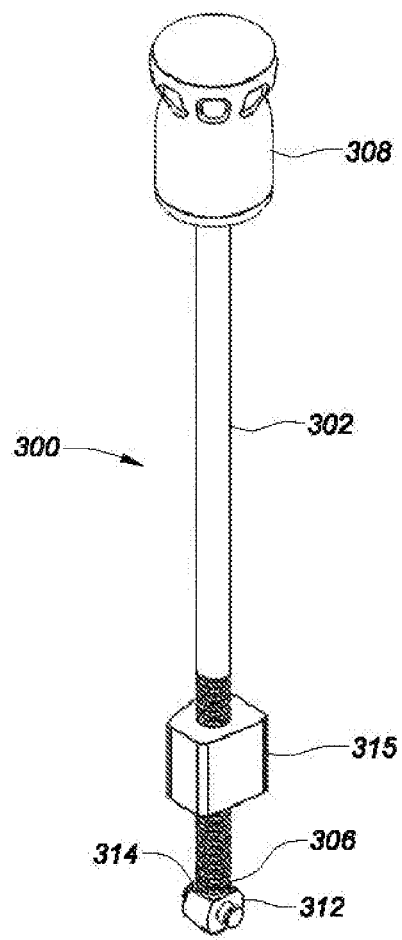
FIG. 41 is a perspective view of a resistance adjustment mechanism.

Another additional embodiment of resistance adjustment assembly 300 is now described with reference to FIGS. 40-41, which show exploded and assembled views of rod 302 and associated components, respectively. In this embodiment, upper follower or guide block 315 may be threaded so that it rides on the threaded portion of rod 302, and as such, moves up and down with rotation of rod 302. The lower follower nut 312 may again include bore 314, but in this embodiment, bore 314 is not threaded, and resides on a smaller diameter portion 306A of distal end 306. In this embodiment, follower nut 312 may be fixed axially, by means of shaft shoulder 306B (formed between the smaller diameter portion 306A and larger diameter threaded of rod 302) and securing screw or clip 316 below nut 312 which allows free rotation. In this embodiment, the threads of guide block 315 would be right-handed, and would also preferably reflect the fast-helix pitch for the reasons discussed above.

Additional embodiments of flywheel 30 that may be configured with exercise bike 12 and used in conjunction with resistance assembly 400 with moveable arm 402, brake assembly 500 and resistance adjustment assembly 300 are now described with reference to FIGS. 31 and 32.

Figure 31:
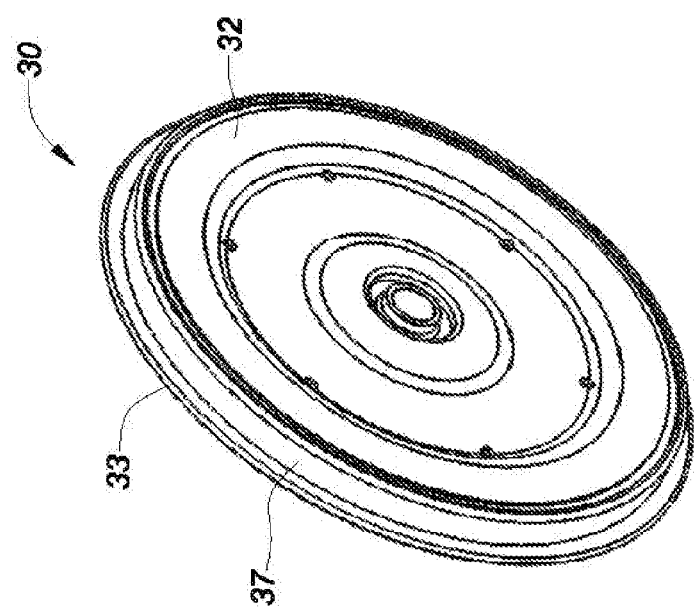
FIG. 31 is a perspective view of a flywheel.

As shown in FIG. 31, flywheel 30 may include outer radial element 32 with one upward disk, for example, left upward disk 33 or right upward disk 35, and inner surface 37. While FIG. 31 depicts flywheel 30 with outer radial element 32 including left upward disk 33 and inner surface 37, outer radial element 32 may instead include right upward disk 35 and inner surface 37. In addition, outer element 32 may include an upward disk that may be positioned anywhere between the left circumferential edge and the right circumferential edge in addition to inner surface 37.

It should be noted that in addition to outer radial element 32, flywheel 30 may include the other elements included in flywheel 30 discussed in earlier embodiments such as inner radial element 34, left radial support shield 36, right radial support shield 38 and other elements and components to facilitate the function of flywheel 30 with exercise bike 12. As such, the foregoing descriptions apply here.

Where flywheel 30 includes left upward disk 33, movable arm 402 may be configured with lower magnets 470 and/or magnets 432 that are preferably positioned on at least left side 436. In this manner, when arm 402 is raised or lowered, the magnets 432 and/or 470 may adjustably pivot down or up, into and out of, the space to the right of left upward disk 33 and generally above inner space 37. In this manner, more or less magnetic resistance may be applied to forward rotating flywheel 30. Also, since right upward disk 35 need not exist in this embodiment, magnets 432 and/or 470 need not be necessarily positioned on right side 438 of moveable arm 402 since there may be no conductive element on outer radial element 32 for such positioned magnets 432 to magnetically interact with.

It should be noted that while the above example depicts outer radial element having left upward disk 33 and not right upward disk 35, the opposite may also be utilized. That is, outer radial element 32 may include right upward disk 35 and not left upward disk 33, and moveable arm 402 may include magnets 432 on at least right side 438 that may magnetically interact with right upward disk 35 to apply magnetic resistance to the forward rotation of flywheel 30.

Figure 32:
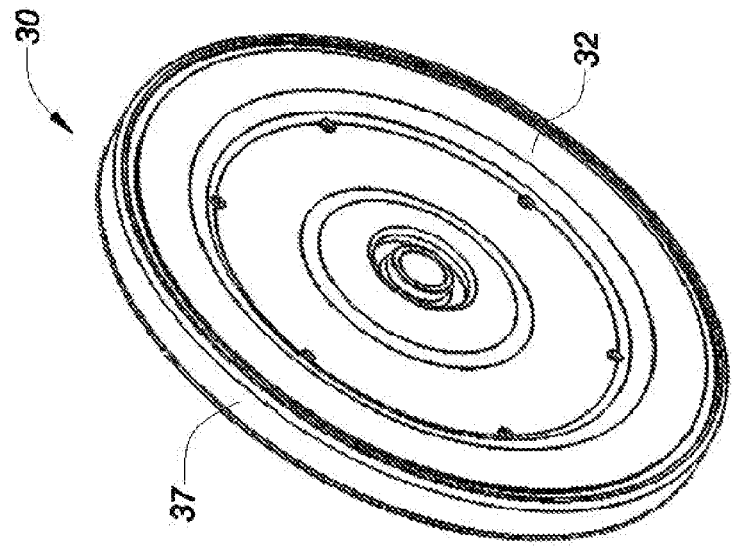
FIG. 32 is a perspective view of a flywheel.

In another embodiment as depicted in FIG. 32, flywheel 30 may include outer radial element 32 with inner surface 37 and no upward disks. It should be noted that in addition to outer radial element 32, flywheel 30 may include the other elements included in flywheel 30 discussed in earlier embodiments such as inner radial element 34, left radial support shield 36, right radial support shield 38 and other elements and components that may be necessary for the proper function of flywheel 30 with exercise bike 12. Because of this, and because the assembly of flywheel 30 in this new embodiment may be similar to the assembly of flywheel 30 in relation to other embodiments described earlier, the detailed assembly of flywheel 30 will not be repeated here but may still apply.

Once assembled, flywheel 30 and outer radial element 32 with inner surface 37 and no upward disks may be configured with exercise bike 12, resistance assembly 400, resistance adjustment assembly 300 and brake assembly 500 as described relation to the embodiments in earlier sections. In this configuration, moveable arm 402 configured with lower magnets 470 may adjustably pivot downward and upward, into and out of the space generally above inner space 37, and in doing so, may apply more or less magnetic resistance to forward rotating flywheel 30.

Additional aspects of the current invention regarding manufacturability are now further described. As shown in FIGS. 23-24, outer radial element 32 may include disks or loops 33, 35 as well as the horizontal material that joins them together. Element 32 may then be attached to inner radial element 34. As noted above, outer radial element preferably comprises aluminum.

Because outer radial element comprises a separate component that may be attached to flywheel 30, it may be formed by a roll form extrusion process in a continuous helix, and cut at desired intervals so that the resulting lengths of outer radial element 34 accommodate the circumference of inner radial element 34 and flywheel 30. That is, outer radial element 34 may be joined to inner radial element by fastening means described above, and the ends of the extruded and cut segment of element 34 may be fastened together by appropriate methods.

This is in contrast to existing magnetic brake systems that use a single disk that may need to be cut out of a sheet of aluminum. By comparison, the extruded outer radial element 32 of the current invention wastes little, if any material; in sharp contrast, cutting a single disk from an aluminum sheet involves considerable waste.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. An adjustable magnetic resistance system for an indoor cycle comprising:
    a flywheel that includes two circumferential disks that are located a distance apart and that extend radially outwardly from the flywheel;
    a pivotable arm that includes at least one magnet and that may be raised and lowered in relation to the flywheel and in between the circumferential disks; and
    a pivot assembly disposed at or near the rear of the pivotable arm for allowing the pivotable arm to pivot between a first position and a second position to thereby adjust the resistance applied to the rotating flywheel.

2. The adjustable magnetic resistance system of claim 1, further comprising an adjustment system that is coupled to the pivotable arm and that is configured to raise and lower the pivotable arm.

3. The adjustable magnetic resistance system of claim 2, further comprising a friction brake coupled to the pivotable arm, and wherein the adjustment system is configured so that it may be pressed downward to cause the friction brake to engage the flywheel.

4. The adjustable magnetic resistance system of claim 1, wherein the pivotable arm experiences a downward force towards the flywheel caused by the magnetic field between the pivotable arm and the flywheel when the flywheel rotates.

5. The adjustable magnetic resistance system of claim 1, wherein there is at least some overlap between the flywheel and the at least one magnet when the pivotable arm is in either a raised position or a lowered position.

6. The adjustable magnetic resistance system of claim 1, wherein the pivotable arm includes a plurality of magnets.

7. The adjustable magnetic resistance system of claim 1, wherein the pivotable arm comprises a first side layer that holds a first set of magnets, a middle layer, and a second side layer that holds a second set of magnets.

8. The adjustable magnetic resistance system of claim 7, wherein the first side layer and the second side layer comprise aluminum and the middle layer comprises steel.

* * * * *